ELEVATOR SUPERVISORY SYSTEM

Filed Oct. 17, 1967

WITNESSES:

Bernard R. Giegue

Richard V. Westerhoff

INVENTORS
Henry C. Savino and
John Suozzo.
BY C. L. Freedman
ATTORNEY

April 7, 1970 H. C. SAVINO ET AL 3,504,770

ELEVATOR SUPERVISORY SYSTEM

Filed Oct. 17, 1967 13 Sheets-Sheet 10

United States Patent Office 3,504,770
Patented Apr. 7, 1970

3,504,770

ELEVATOR SUPERVISORY SYSTEM

Henry C. Savino and John Suozzo, Hackensack, N.J., assignors to Westinghouse Electric Corporation, Pittsburgh, Pa., a corporation of Pennsylvania Filed Oct. 17, 1967, Ser. No. 675,907
Int. Cl. B66b 1/34
U.S. Cl. 187—29 23 Claims

ABSTRACT OF THE DISCLOSURE

A zoned demand elevator supervisory system wherein the lower section of each zone is considered separately for the purpose of improved down elevator service. If a quota of two down calls per car serving down calls in a particular zone is exceeded, an additional car is assigned to the zone. Under typical conditions, the first car assigned to down calls in a zone will proceed to the highest down call in the zone, while the second will proceed to the highest down call in the lower section of the zone. However, when down calls have gone unanswered at selected floors in the lower section of a zone for a predetermined time, the lower section of that zone receives priority.

Ordinarily up demands receive preference over down demands for the assignment of available cars, but when at least one car is serving up calls, and for a predetermined period of time after the last car serving up calls completes its upward trip, down demands receive preference over up demands. In addition, during periods of heavy down traffic, the preference of a particular down demand is reestablished if the assignment of a car to the demand is cancelled by the registration of a car call in the car assigned.

When no demands exist, an idle car at the main floor is sent to an intermediate floor to park. When a demand for service is registered while a car is proceeding to the parking floor, normal car assignment procedures are suspended for a time sufficient to assign the parking car to the demand if it is in position to answer the corridor calls creating the demand.

CROSS-REFERENCE TO RELATED APPLICATION

This application is related to our patent application Ser. No. 675,879 filed concurrently herewith.

BACKGROUND OF THE INVENTION

This invention relates to transportation supervisory systems and more specifically to elevator supervisory systems. The wide variations in the direction and volume of traffic which such a system must accommodate for over a normal operating period are well known. The objective in designing an elevator supervisory system is to arrive at a system with the ability to accommodate for variations in traffic demands which is economically justified by the demands of the traffic situation in which it is to be employed.

The supervisory system described in our patent No. 3,256,958 is a very sophisticated system suitable for installations involving large banks of elevators in high rise buildings with a great deal of traffic. The system described in our copending application, referred to above, is a simple yet versatile system suitable for use in installations involving small banks of elevators in low rise buildings with moderate traffic demands. The system to be herein described is a modification of the system disclosed in our copending application which is hereby incorporated by reference into this application. The system is designed for installations involving larger banks of elevators in buildings with higher rises and larger traffic demands than those for which the system in our copending application was designed for, but wherein the requirements do not justify the higher cost inherent in the system disclosed in our prior patent.

In the usual elevator installation there is one main floor at which most of the passengers board the elevators upon entering the building and at which most of the passengers exit the elevator when leaving the building. In most buildings this is the lower terminal floor so that most of the requirements for service are for floors above the main floor even though there may be occasional requirements for service to extension floors below the main floor. In this typical installation, most of the requirements for up-service originate at the main floor, however, requirements for down-service occur randomly at any of the floors. One of the most difficult problems therefore, is to provide equitable service for passengers requesting down service at the various floors. If cars are dispatched to answer the highest down call and down calls are continually being registered for the higher floors, the lower floors will receive very poor service. This is especially true in those systems where the cars bypass corridor calls when they become loaded to capacity.

Both the prior patent and the copending application provide that the floors be grouped into zones as a means for providing more equitable service for traffic in both the up and down directions. This invention discloses further means for providing more equitable service, especially in the down direction.

SUMMARY OF THE INVENTION

According to this invention the lower floors in each zone are separately recognized for the purpose of satisfying down corridor calls. Although selection of the number of floors to be included in the sub-zone is arbitrary, for purposes of illustration the lower half of each zone has been designated as the sub-zone and will be referred to as the lower section of the zone.

The invention also calls for the establishment of a quota of down calls for a car which is answering down corridor calls. Accordingly, if one car is answering down corridor calls in a particular zone and more than a quota of calls are registered for that zone, another available car will be dispatched to serve down demands in that zone even though no down demand exists, as where all the down corridor calls are below the car already answering down calls.

The first car to be dispatched to a zone in which down corridor calls are registered is normally sent to the highest down call in that zone. When the quota is exceeded and a second car is dispatched to that zone, it will be sent to the highest down call in the lower section of the zone provided a call is registered in the lower section. If not, the second car will proceed to the highest down call then registered in the zone. If a car is assigned to down corridor calls in the lower section of a zone, and it is located above the lower section, it will bypass all down corridor calls in the upper section of the zone until it reaches the lower section. If the car is below the highest down call in the lower section at the time it is assigned to down calls in the lower section of a zone, it will travel upward until reaching the floor at which the highest down corridor call in the lower section is registered.

If a car serving down corridor calls in a zone is above all the down corridor calls in the zone so that no down demand for that zone is created, another car can still be assigned to the lower section of that zone if the quota of down calls for the first car is exceeded. However, a second car will not be so assigned if there is a down demand registered in another zone.

One floor in the lower section of each zone is selected for timing down corridor calls. If a down corridor call goes unanswered at one of these floors for a predetermined time, a time down corridor call is registered. First priority is given to such calls. If timed-out calls exist in more than one zone, the first available car will be sent to the highest timed-out down call.

Demands for service are satisfied one at a time by the assignment of available cars as in the system described in the copending application. Demands are given preference in a predetermined order which can be varied according to the traffic situation. Under normal conditions, when no cars are running up, up demands take preference over down demands. However, when a car is answering up calls, down demands take preference and up de mands will not be answered until the down demands in all the zones are satisfied. On the other hand, if no car is serving up calls for a predetermined time after the last car completes an up trip, then up demands take preference unless the system is operating under down peak conditions.

The system will go on down peak operation under three conditions: (1) when a car answering down calls is loaded to capacity, (2) when a timed-out call is registered in any zone, and (3) when a quota of down corridor calls is exceeded in more than one zone. During down peak operation, down demands are given preference. In order to provide equitable service for down demands during periods of heavy down traffic, preference to down demands is alternated between down demands in the high zone and down demands in the low zone. However, as mentioned above, if a timed-out down call is registered it receives immediate attention. The system will then return to alternate preference between down demands in the high zone and the low zone.

The system is designed to give priority to car calls, therefore, an assign will be canceled if a car call is subsequently registered. This most frequency occurs to the "next" car which is the car waiting at the main floor with its doors open for passengers entering the building who desire elevator service. If this car is assigned to a demand, but a passenger enters the care before the doors close and registers a car call, the assignment will be canceled. Although the demand will be reestablished, this disrupts the alternation of preference between down demands in the high zone and low zone during down peak operation. In order to eliminate this problem, means are provided for reestablishing the preference of a down demand when an assignment has been canceled by a car call.

The system also provides for sending a car to a parking floor if it becomes available at the first floor when there are no demands for service and it has not been selected as the "next" car or the "non-next" car (see our copending application for an explanation of these terms). The car is preferably sent to an intermediate floor to park, so that it will be in a better position to answer subsequently registered calls. The invention provides that a car which is proceeding to a parking floor may be assigned to a demand for service while enroute. In fact, assignment of other cars is suspended for a time sufficient to assign the parking car to the demand if it is in position to serve the calls creating the demand. If the parking car is not in position, it proceeds to the parking floor and the normal assignment circuits take over. In addition, the parking car can stop for any corridor calls on the way to the parking floor for service in the same direction that the car is traveling in.

It is, therefore, a first object of the invention to provide an improved elevator system comprising a bank of elevator cars.

It is a second object of the invention to provide an improved elevator system comprising a bank of elevator cars wherein improved service is provided in a first direction.

It is a third object of the invention to provide an improved elevator system as defined in the preceding paragraph, wherein the floors are divided into zones and the zones are divided into sub-zones and wherein a car may be assigned to answer calls in the entire zone or only in the sub-zone.

It is a fourth object of the invention to provide an improved elevator system of the type described in the third object, wherein an additional car will be dispatched to answer calls in a zone when the number of calls in that zone exceeds a predetermined quota.

It is a fifth object of the invention to provide an improved elevator system as described in the previous paragraph wherein the second car assigned to a zone will be assigned to the sub-zone.

It is a sixth object of the invention to provide an improved elevator system wherein corridor calls at preselected floors receive expedited service if the call remains unanswered for a predetermined period of time.

It is a seventh object of the invention to provide an improved elevator system comprising a bank of elevator cars wherein the preference given to a demand created by corridor calls to which a car has been assigned is reestablished if the assignment is canceled.

It is an eighth object of the invention to provide an improved elevator system comprising a bank of elevator cars wherein an idle car being sent to a parking floor may be assigned to demands for service while enroute tothe parking floor.

It is a ninth object of the invention to provide an improved elevator system wherein demands for service in a first direction are given first preference if no cars are serving corridor calls in the first direction and wherein demands for service in the other direction are given first preference if there is a car serving corridor calls in the first direction.

Figure 11:
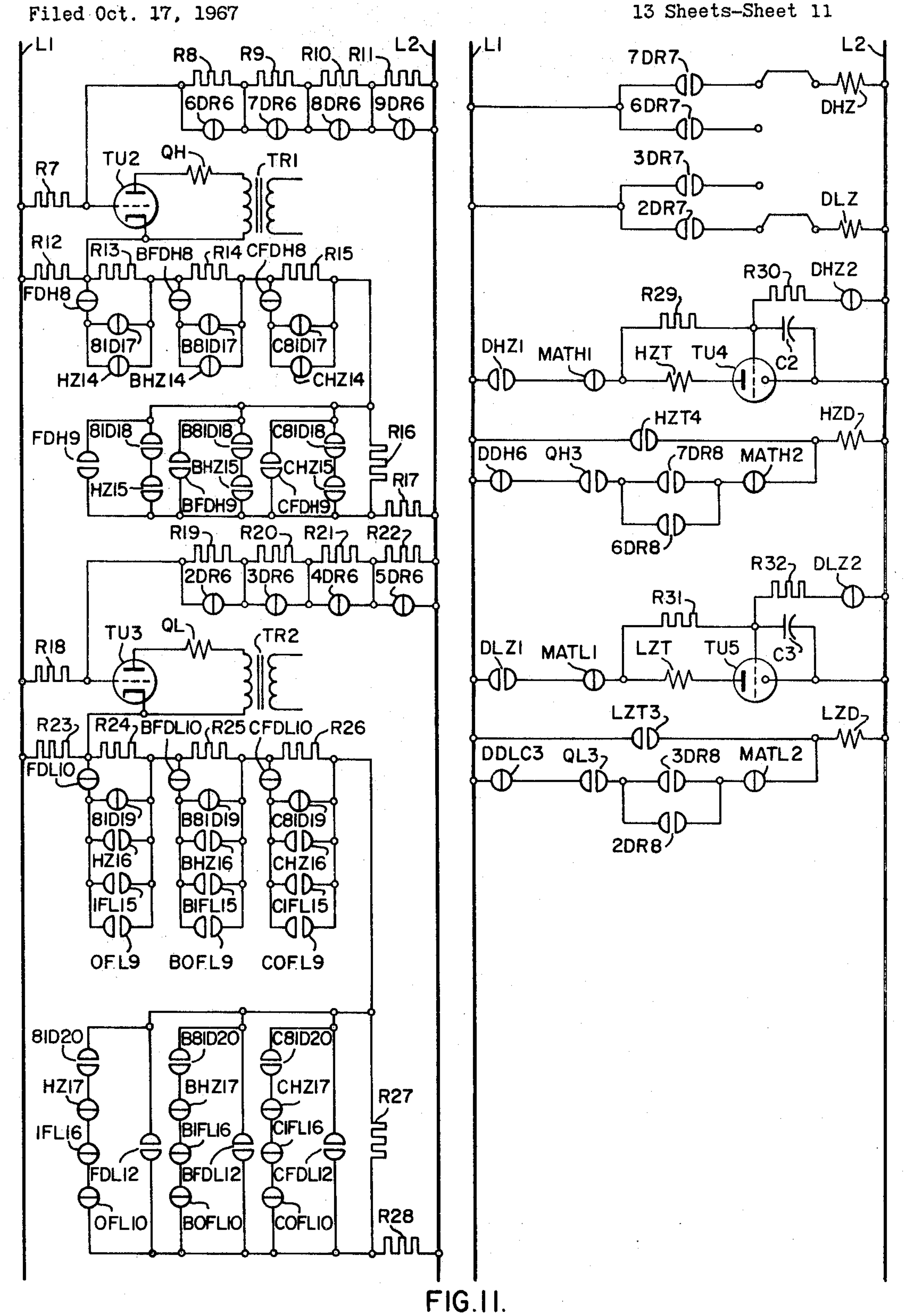
Figure 12:
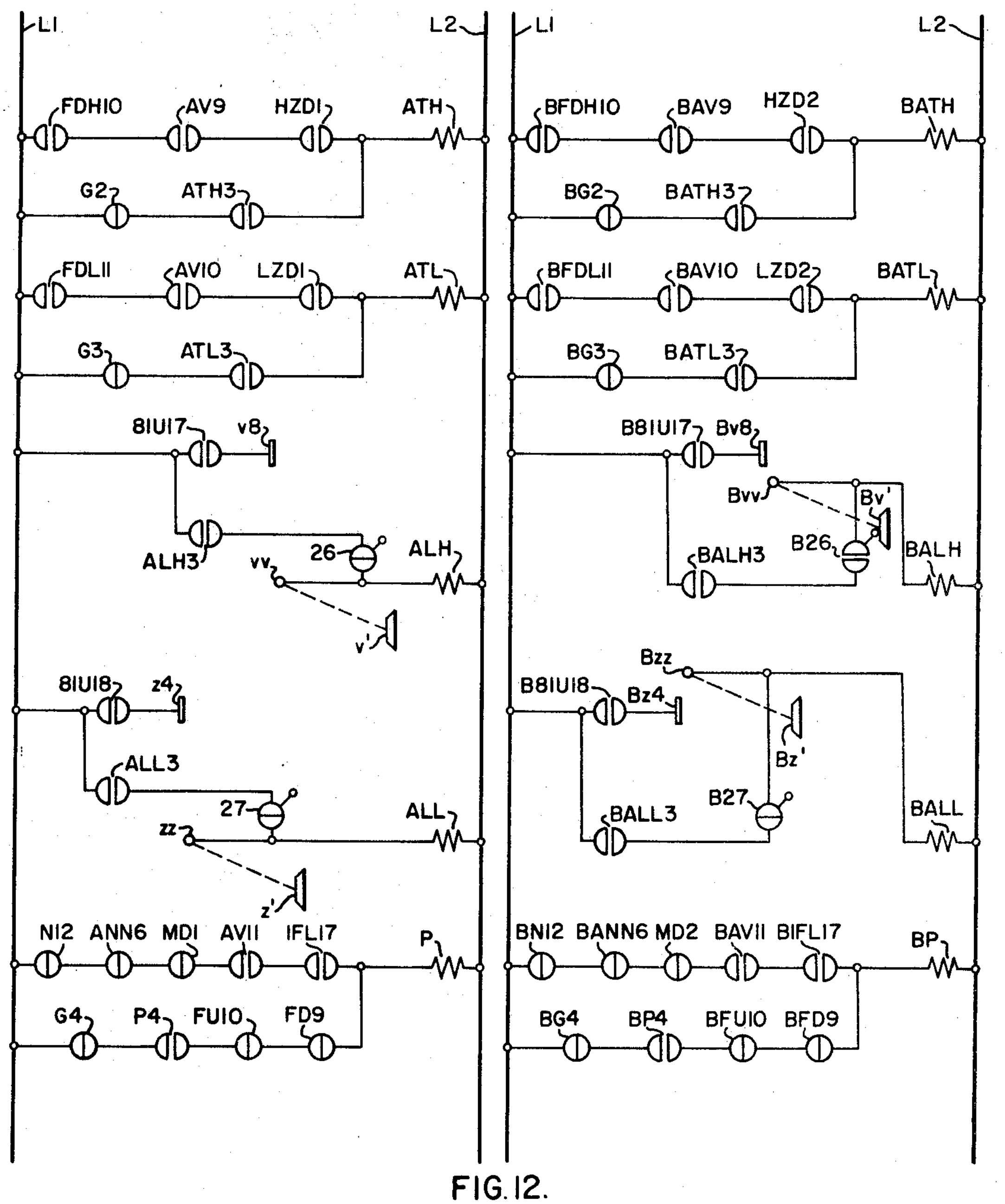
Figure 13:
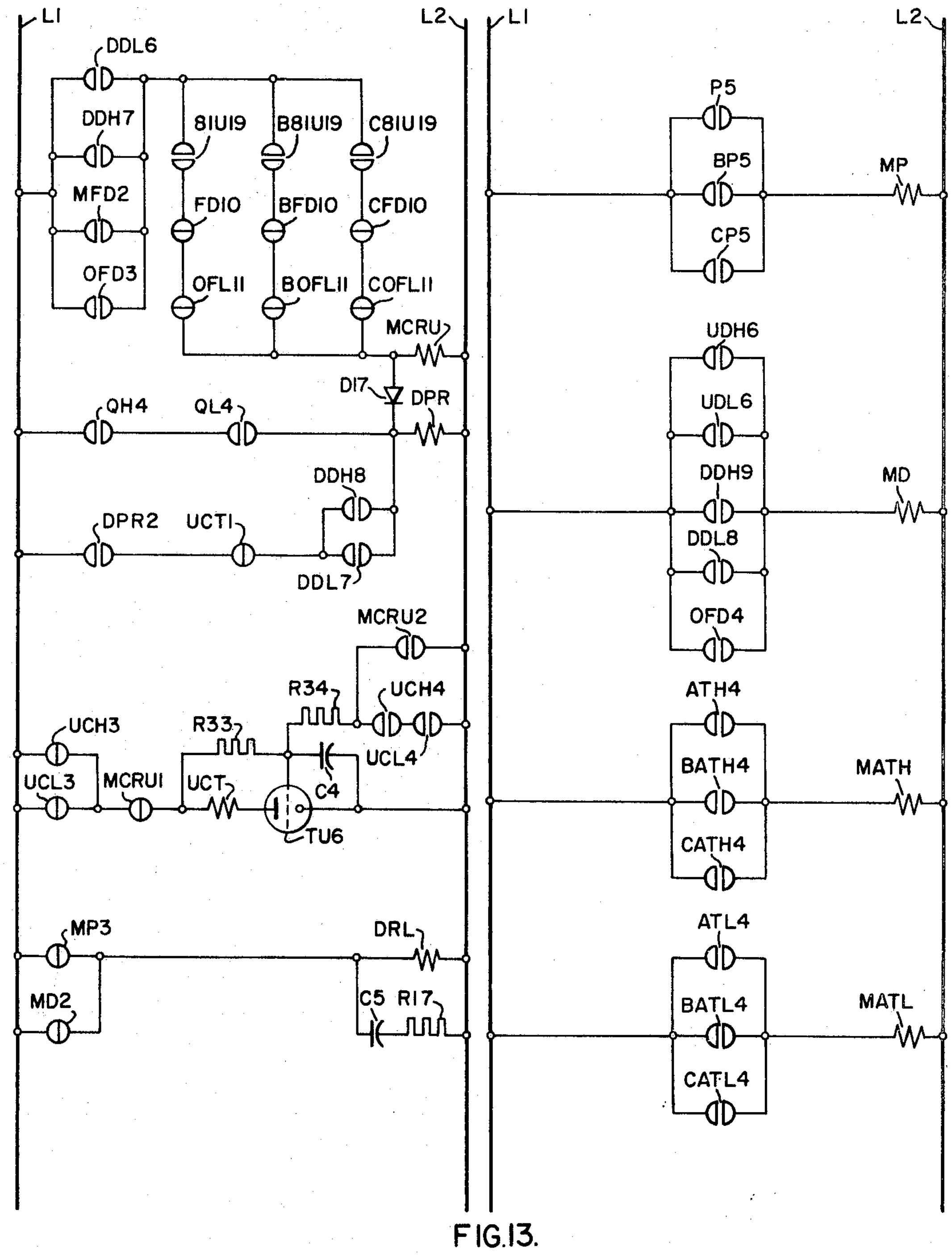

The circuit shown in FIGURES 1 through 10 are basically the same as those disclosed in our copending application. Modifications of those circuits to illustrate an embodiment of the invention which is the subject of this application are shown in heavy lines. All of the circuits illustrated in FIGURES 11 through 13 are peculiar to the present invention.

DESCRIPTION OF THE PREFERRED EMBODIMENT

Although aspects of the invention may be incorporated in a vehicular system having several vehicles or cars, arranged either for attendant operation or for automatic operation to serve any desired number of landings, the invention may be described adequately with reference to an elevator system having three elevator cars serving a building or structure having nine floors and a basement, and arranged for fully automatic operation. In the system described the first floor will be considered the main floor, the second through fifth floors will comprise the low zone with the second and third floors designated as the lower section of the low zone and the sixth through ninth floors will comprise the high zone with the sixth and seventh floors designated as the lower section of the high zone. For purposes of illustration, only one basement floor will be considered, although the principles involved could be applied to a system having multiple extension floors below the main floor.

Since the invention described herein is a modification of the invention disclosed in our copending application, a detailed description will only be given here of the modifications. For a comprehensive description of the basic operation of the system, reference should be made to our copending application.

As in our copending application, the three elevator cars will be referred to as the A, B and C cars. Inasmuch as substantial portions of the circuits are identical for all three cars, only those circuits for the A and B cars will be illustrated although components of the C car will be illustrated where necessary. Components associated only with the A car will be referred to by the basic designation for that component. The identical component associated with the B car will be preceded by the letter B and those of the C car by the letter C. Furthermore, certain circuit components are associated with a particular floor. Where this occurs, the reference character will be preceded by a numeral indicating the particular floor with which it is associated. For instance, components associated with the main floor will be preceded by the numeral 1. Components associated with the basement floor level will be preceded by the numeral 0.

It should be noted also that certain components of the system are common to all of the elevator cars. In order to assist in understanding the invention, those components associated with each elevator car individually and those which are common to all of the elevator cars are as follows (those components shown in italics are peculiar to the subject invention, while all the other components also appear in our copending application):

APPARATUS FOR ELEVATOR CAR A

AHZ—High Zone Available Car Relay
ALH—ABOVE LOWER SECTION OF HIGH ZONE RELAY
ALL—ABOVE LOWER SECTION OF LOW ZONE RELAY
ALZ—Low Zone Available Car Relay
ATH—ASSIGNED LOWER SECTION OF HIGH ZONE
ATL—ASSIGNED LOWER SECTION OF LOW ZONE
AN—Next Available Car Relay
ANN—Non-next Available Car Relay
AV—Available Car Relay
D—Downswitch
DA—Auxiliary Door Relay
DBH—Down Call Behind In High Zone Relay
DBL—Down Call Behind In Low Zone Relay
DC—Door Close Relay
DO—Door Open Relay
DS—Door Relay
E—Inductor Slown Down Relay
F—Inductor Stopping Relay
FD—Down Demand Assignment Relay
FDH—High Zone Down Demand Assignment Relay
FDL—Low Zone Down Demand Assignment Relay
FU—Up Demand Assignment Relay
FUH—High Zone Up Demand Assignment Relay
FUL—Low Zone Up Demand Assignment Relay
G—Holding Relay
HZ—High Zone Relay
LW—Load Weighing Switch
M—Running Relay
MGS—Motor Generator Switch
L—Next Car Relay
ND—Notching Relay
P—PARKING RELAY
PW—Up Peak Weighting Relay
SS—Main Floor Starting Relay
STR—Light Bean Relay
T—Car Call Stopping Relay
TFL—Top Floor Relay
U—Up Switch
UBH—Up Call Behind In High Zone Relay
UHL—Up Call Behind In Low Zone Relay
V—Speed Relay
OCR-9CR—Car Call Registering Relays OFL—Basement Relay
OUR-8UR—Up Corridor Call Registering Relays
1DR-9DR—Down Corridor Call Registering Relays
1FL—Main Floor Relay
38D—Car Call Below Relay
38R—Car Call Above Relay
42—Auxiliary Door Control Relay
45—Door Control relay
70T—Non-Interference Relay
78DD—Down Call Ahead Relay
78UU—Up Call Ahead Relay
79—Basement Assignment Relay
80—Second Auxiliary Running Relay
81—Auxiliary Running Relay
81D—Down Preference Relay
81U—Up Preference Relay
87—Main Floor Assignment Relay
438—Stopping Relay

APPARATUS COMMON TO ALL CARS

DCH—Down Corridor Call In High Zone Relay
DCL—Down Corridor Call In Low Zone Relay
DDH—Down Demand In High Zone Relay
DDHA—Auxiliary Down Demand In High Zone Relay
DDL—Down Demand In Low Zone Relay
DDLA—Auxiliary Down Demand In Low Zone Relay
DDLC—Down Demand In Low Zone Cutout Relay
DHZ—HIGH ZONE DOWN CALL REFERENCE RELAY
DLZ—LOW ZONE DOWN CALL REFERENCE RELAY
DPR—DOWN DEMAND PREFERENCE RELAY
DRL—ASSIGNMENT DELAY RELAY
HCR—High Call Return Relay
HZD—HIGH ZONE LOWER SECTION DEMAND RELAY
HZT—HIGH ZONE TIMER RELAY
ID—Down Peak Relay
LZD—LOW ZONE LOWER SECTION DEMAND RELAY
LZT—LOW ZONE TIMER RELAY
MAHZ—Master High Zone Available Car Relay
MALZ—Master Low Zone Available Car Relay
MAN—Master Next Available Car Relay
MANN—Master Non-Next Available Car Relay
MAT—MASTER LOWER SECTION OF HIGH ZONE ASSIGNMENT RELAY
MATL—MASTER LOWER SECTION OF LOW ZONE ASSIGNMENT RELAY
MCRU—MASTER CAR RUNNING UP RELAY
MD—MASTER DEMAND RELAY
MFD—Master Floor Demand Relay
MFDA—Auxiliary Main Floor Demand Relay
MHU—Master Up Car In High Zone Relay
MN—Master Next Car Relay
MP—MASTER PARKING RELAY
M79—Master Basement Assignment Relay
M87—Master Main Floor Assignment Relay
NDR—No demand Return Relay
NDS—No Demand Service Relay
PT—Peak Traffic Timer Relay
QH—HIGH ZONE QUOTA RELAY
QL—LOW ZONE QUOTA RELAY
UCH—Up Call In High Zone Relay
UCL—Up Call In Low Zone Relay
UCT—UP CALL TIMER RELAY
UDH—Up Demand High Zone Relay
UDHA—Auxiliary Up Demand In High Zone Relay
UDL—Up Demand In Low Zone Relay
UDLA—Auxiliary Up Demand In Low Zone Relay
U1T—First Dispatching Interval Relay U2T—Second Dispatching Interval Relay
OFD—Basement Demand Relay
OFDA—Auxiliary Basement Demand Relay In order to present the invention in an orderly manner the operation of the apparatus will be described as it appears in FIGURES 1 through 13 first. Only those circuits in FIGURES 1 through 10 which differ from the circuits in FIGURES 1 through 10 of our copending application will be described. As mentioned this will include only those circuits shown in heavy lines. All of the circuits illustrated in FIGURES 11 through 13 will be described in detail. Following the discussion of individual figures several typical operations will be described to illustrate how the components are functionally inter-related.

FIGURE 1

The first figure depicts the motor control circuits for the cars A and B including the starting and stopping circuits. In addition, the activating circuit for the non-interference relay is illustrated. The components with the elevator car A are shown on the left side of the figure while those associated with the car B are located on the right side of the figure.

Figure 1:
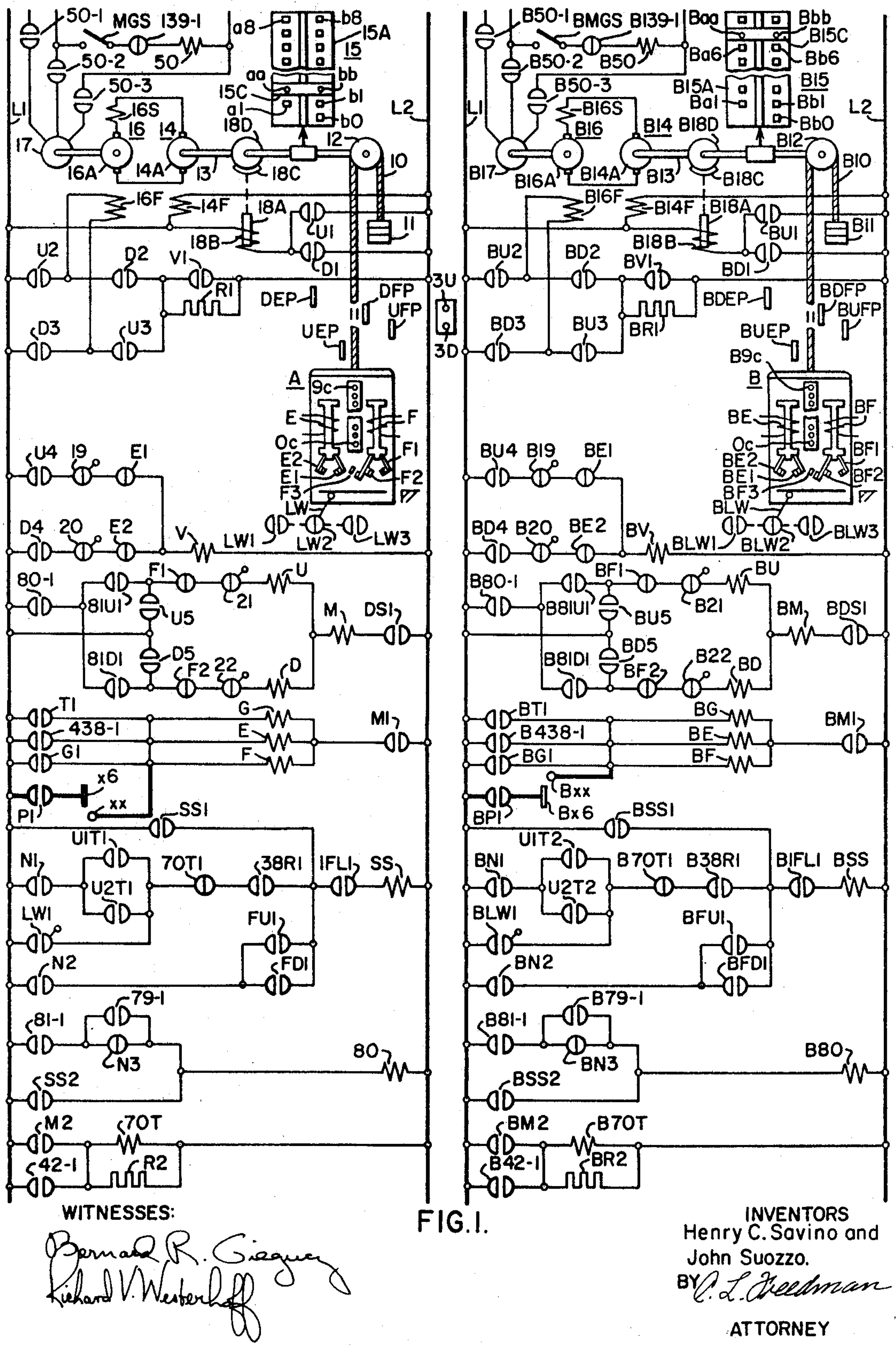
FIGURE 1 is a schematic view in straight line form of a portion of an elevator control system embodying the invention.

The modification of FIGURE 1 is a means for stopping a car which has been assigned to park as the designated parking floor. Although any floor could be selected as the parking floor, the lowest floor in the high zone, or the sixth floor, which places the parked car approximately in the middle of the shaft was chosen for purposes of illustration. The brush *xx* comes into contact with the segment *x6* on the floor selector when the floor selector notches into the parking floor. If the car has been assigned to park (make contacts P1 closed) the following circuit will be completed to energize the holding relay G:

**L1, P1, *x6*, *xx*, G, M1, L2**

The contacts M1 are closed as long as the motor of the car is running. The relay G will be held in through its holding contacts G1. These contacts also provide a circuit for energization of the inductor slow down relay E and the inductor stopping relay F. The elevator car will then stop at the parking floor in a manner similar to that described in connection with FIGURE 1 of our copending application.

FIGURE 2

This figure depicts the corridor call circuits and circuits for the stopping relay 438. The changes in this figure include modifications of the floor designations to reflect the nine floors in the system being described. Floors 3 through 6 and 8 are not shown due to space limitations, however, circuits associated with these floors operate in a manner similar to those illustrated.

Figure 2:
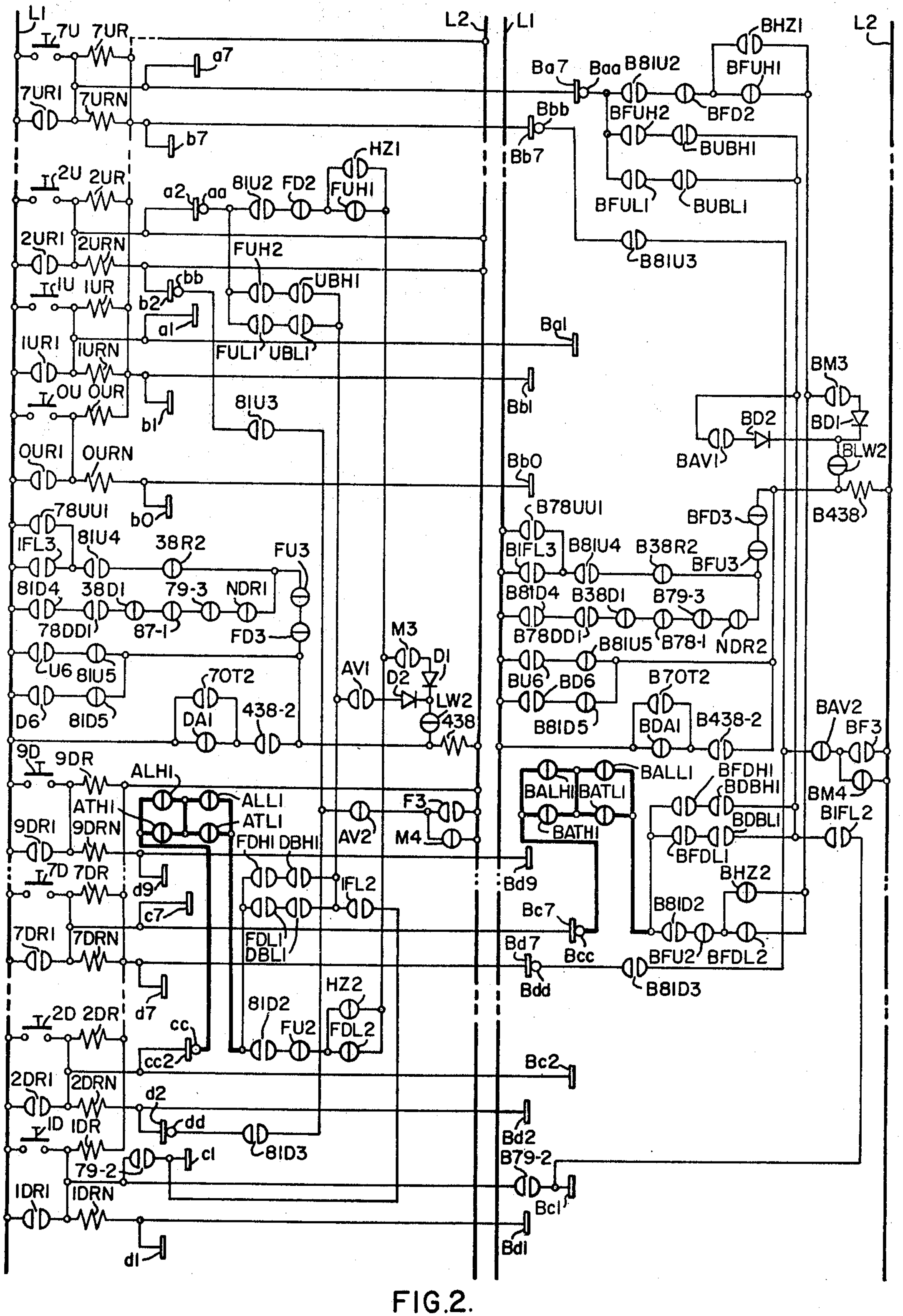
FIGS. 2 through 13 are schematic views with circuits shown in straight line form of further portions of the elevator control system illustrated in FIGURE 1.

The modification of FIGURE 2 is a means for causing a car to bypass down corridor calls in the upper section of a zone while it is traveling downward on an assignment to respond only to down corridor calls in the lower section of the zone. Our copending application described in detail the process by which a car assigned to down corridor calls in the low zone bypassed down corridor calls in the high zone while traveling down to reach the low zone. To explain briefly, assume that the A car is in the high zone (break contacts HZ2 open) and that it is assigned to down corridor calls in the low zone (break contacts FDL2 open). Under such circumstances, even though the car is traveling down (make contacts 81D2 closed) and it is not assigned to up calls (break contacts FU2 closed), the stopping relay 438 cannot be energized when the selector notches into a floor in the high zone at which a down corridor call is registered. When the car reaches the low zone, the contacts HZ2 close (as do the contacts FDL2) and, ignoring the modification for a moment, the A car will stop for all down corridor calls in the low zone. If the car is assigned to the lower section of the low zone, however, the break contacts ATL1 will be open as explained below. As long as the elevator car A remains above the highest floor in the lower section of the low zone, the break contacts ALL1 will also be open. Therefore, even though the car is traveling downward in the low zone, it will not stop for down corridor calls in the upper section of the zone. When the car reaches the highest floor in the lower section of the low zone, the contacts ALL1 will close and the A car will stop for down corridor calls as explained in our prior patent. Similarly, if the A car is assigned to down corridor calls in the lower section of the high zone (break contacts ATH1 open) and it is above the lower section of the high zone (break contacts ALH1 open), it will bypass all down corridor calls until it reaches the highest floor in the lower section of the zone (break contacts ALH1 close).

FIGURE 3

Figure 3:
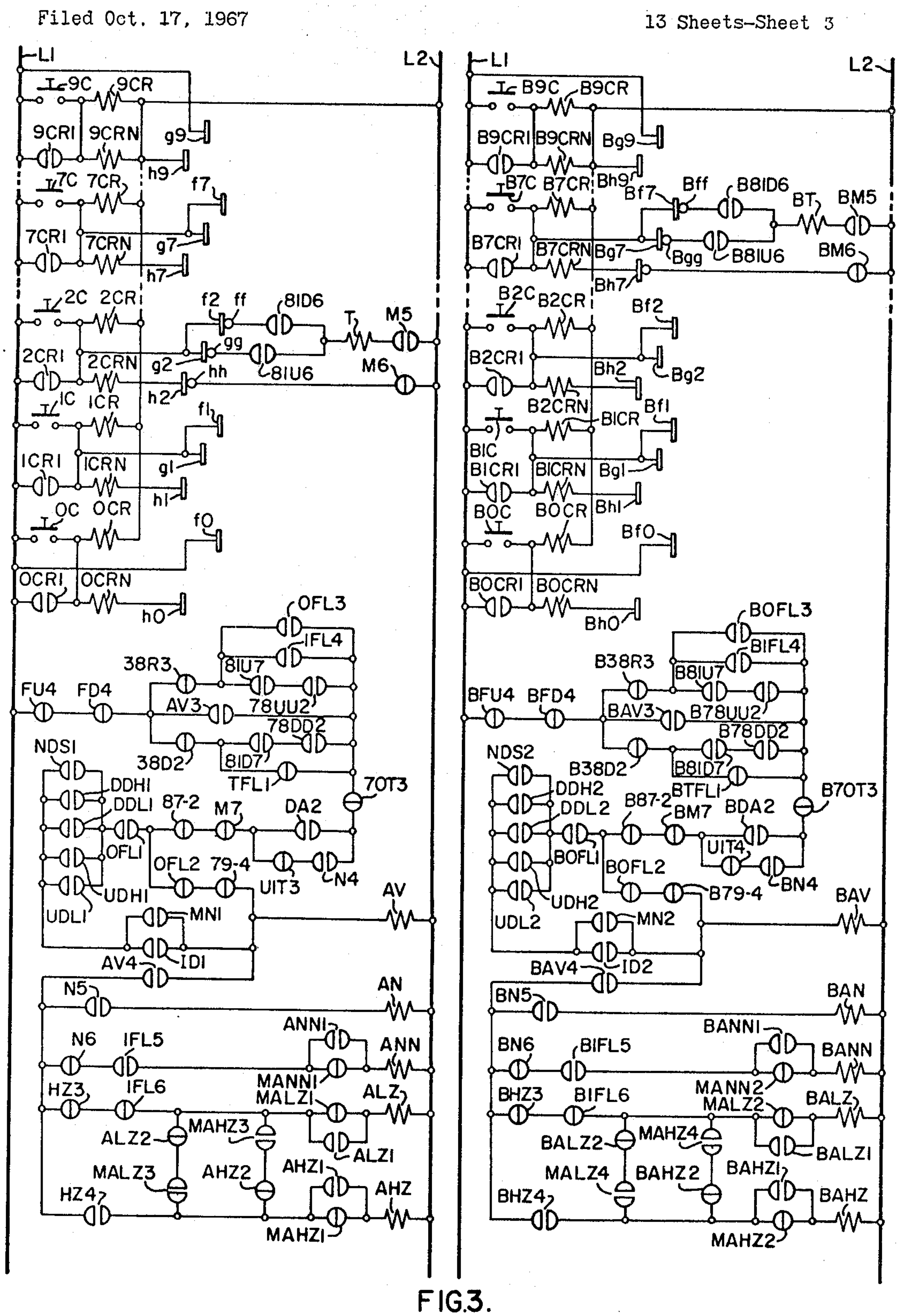

FIGURE 3 depicts the car call circuits and the circuits for the available car relays. The only modifications relate to the illustration of the proper number of floors.

FIGURE 4

This figure depicts the up call behind and the down call behind relays for both the high and the low zone in addition to the circuits for the relays indicating the existence of up corridor calls and down corridor calls in both the low zone and the high zone. The up call behind in the low zone relay UBL and the up call behind in the high zone relay UBH indicate the existence of an up corridor call at a floor below the floor at which the car is located in the low zone and the high zone respectively. The circuits illustrated are the same as those in the copending application except again for changes in floor designations.

Energization of the relays DBL and DBH indicate, as in the copending application that there is no down corridor call registered in the zone in which the car is located for a floor above the position of the car when the car is in the low zone and high zone respectively. For purposes of illustration, the A car is shown at the second floor (brush *mm* in contact with segment *m2*) while the B car is shown at the seventh floor position (brush B*ll* in contact with segment B*l7*). As in the circuits of FIGURE 4 of the copending application, if a down call is registered at the fourth floor which is in the low zone (break contacts 4DR2—not shown—open) the relay DBL will be deenergized thus indicating the presence of a down corridor call in the low zone above the elevator car A. However, according to the subject invention the lower floors in the high zone and the low zone are also separately considered as the lower section of the zone for the purpose of serving down corridor calls. Accordingly, when the elevator car A is assigned to the lower section of the low zone (make contacts ATL2 closed) the relay DBL remains energized despite the corridor call at the fourth floor through the following circuit:

**L1, ATL2, 3DR4, *m2*, *mm*, D8, DBL, L2**

It is obvious however that if a down corridor call is registered at the third floor (break contacts 3DR4 open) that the relay DBL will be deenergized, thus indicating a down corridor call behind the elevator car A in the lower section of the low zone. If the elevator car A is located above the lower section of the low zone (that is above the third floor) the contact ALL2 will be closed thus providing energization of the relay DBL as long as the car is assigned to the lower section of the low zone (make contacts ATL2 closed) irrespective of down corridor calls in either the upper or lower sections of the low zone. The blocking diodes D15 and D16 are provided to prevent the energization of the relay BDBL or CDBL when the A car is assigned to the lower section of the low zone and there are down corridor calls in the upper section of the low zone.

Figure 4:
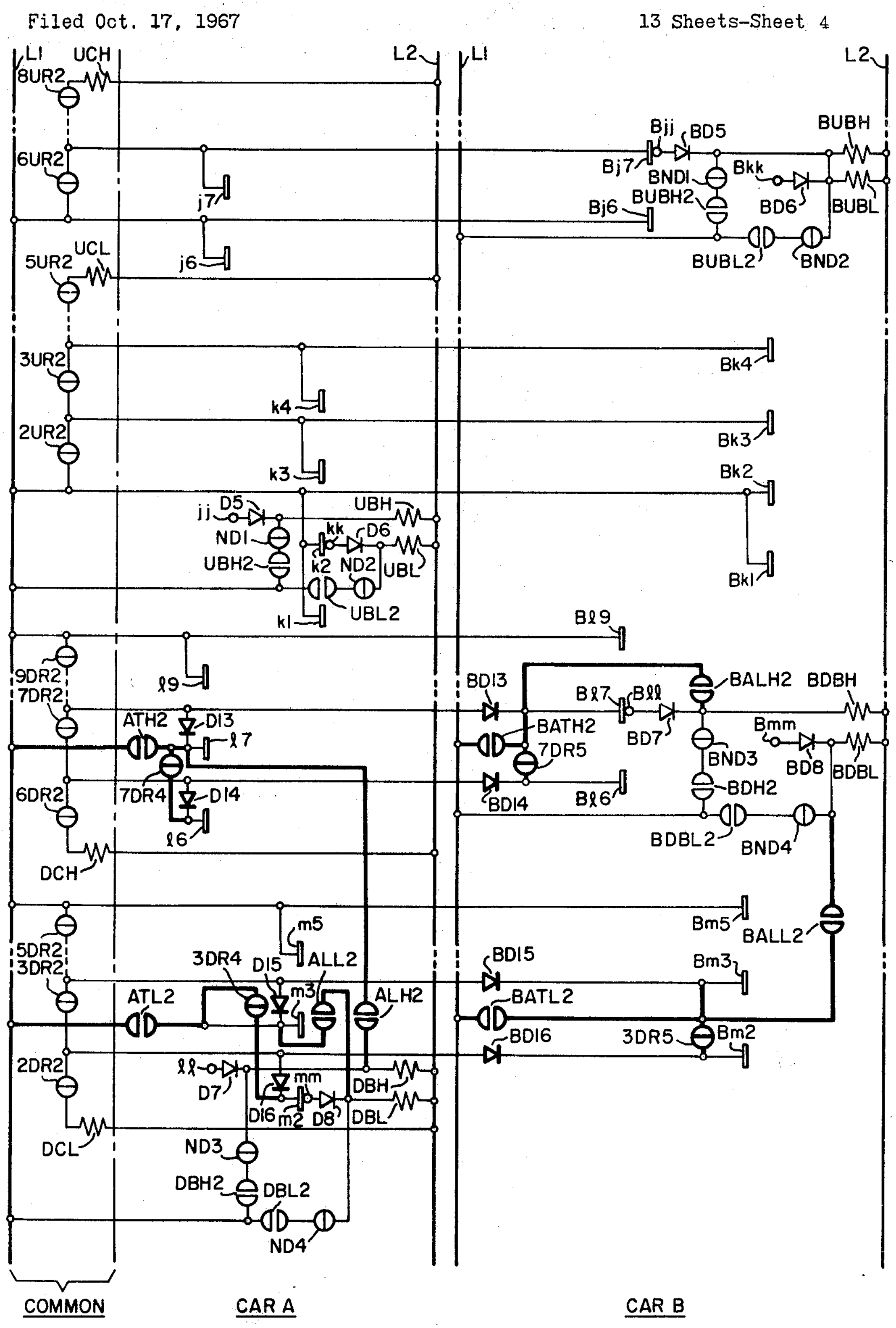
Figure 5:
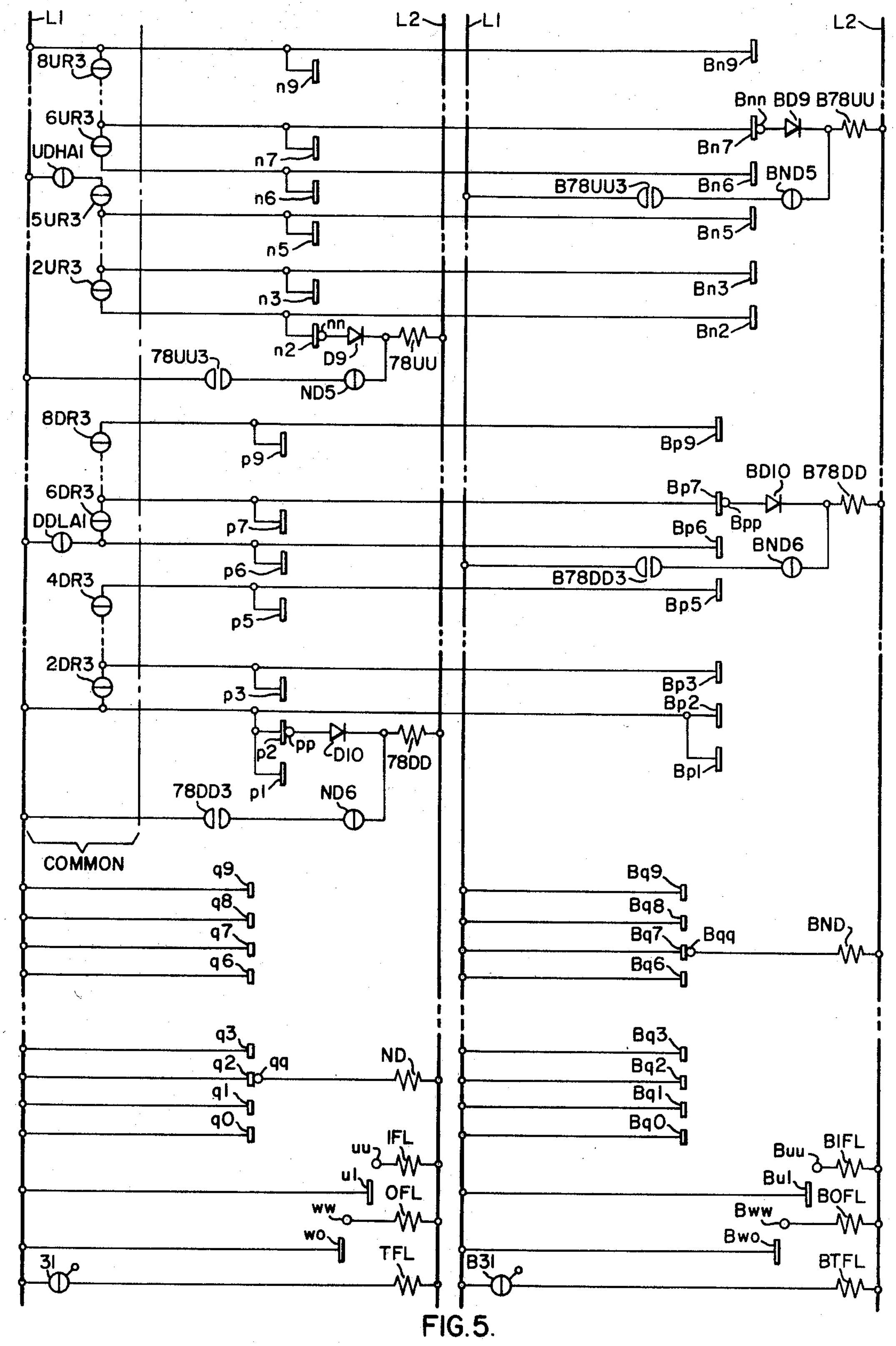

Operation of the down call behind in the high zone relay DBH, can be understood by reference to the circuits associated with the B car which is shown in FIGURE 4 as being adjacent the seventh floor. If a corridor call is registered at the eighth or ninth floor (break contacts 9DR2 or 8DR2—not shown—open) the relay BDBH will be deenergized unless the B car is assigned to down calls in the lower half of the high zone (make contacts BATH2 closed). Under the latter circumstances the relay BDBH would be energized through the following circuit:

L1, BATH2, B*l*7, B*ll*, BD7, BDBH, L2

If the B car is at the sixth floor the relay BDBH is deenergized despite the fact that it is assigned to the lower half of the high zone if there is a down corridor call registered at the seventh floor (break contacts 7DR5 open). As was the case with the low zone, if the B car is assigned to the lower half of the high zone and is above the lower half of the high zone, the relay BDBH will be energized despite the presence of down corridor calls through the contacts BALH2. In addition, the blocking diodes BD13 and BD14 perform a function similar to that described above for diodes D15 and D16.

FIGURE 5

This figure illustrates the up call ahead and down call ahead circuits in addition to the circuits for the notching relays and the relays indicating the presence of a car at the first floor, the basement and the top floor. Again the only modifications here reflect the addition of the eighth and ninth floors.

FIGURE 6

Figure 6:
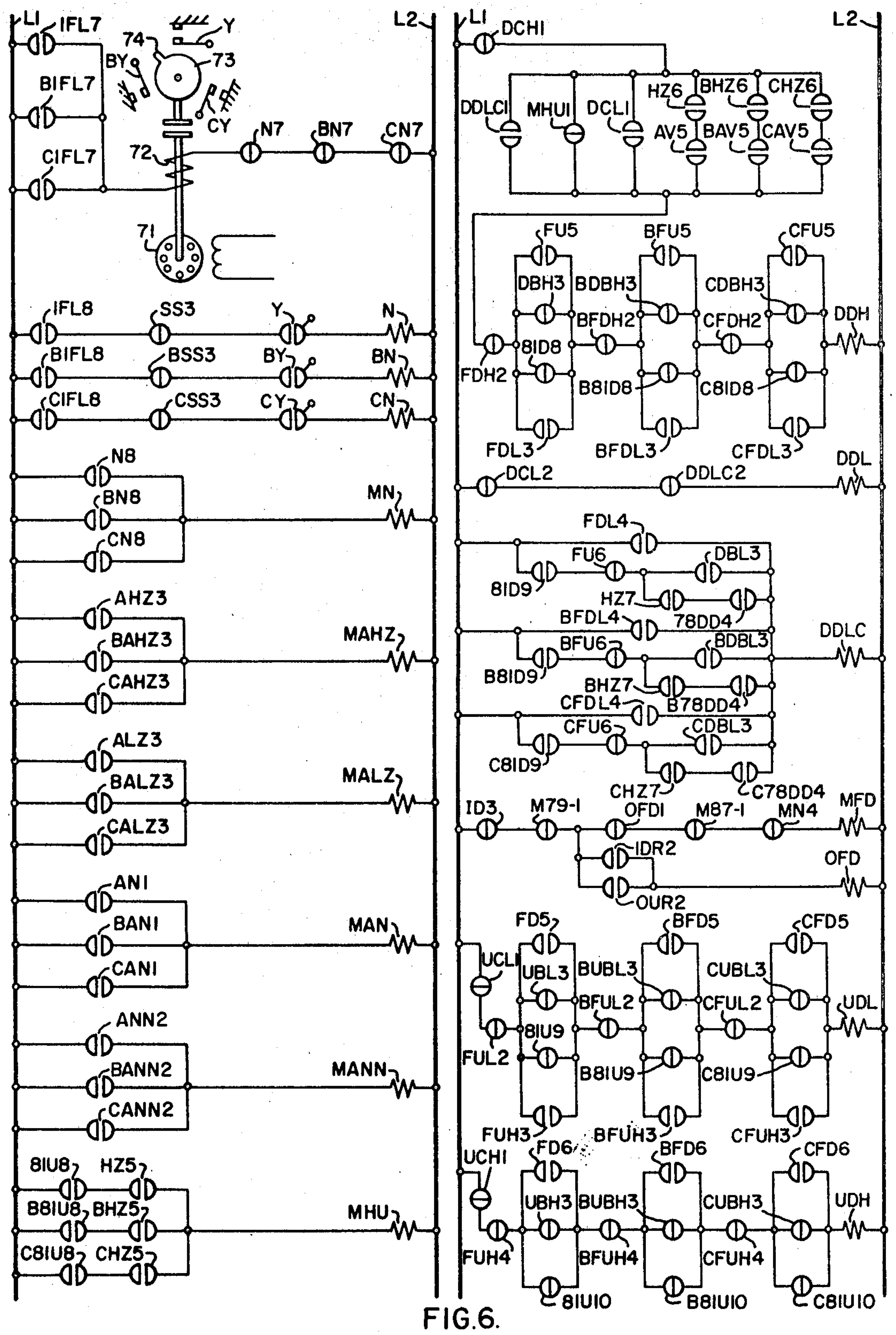

FIGURE 6 depicts the circuits for selecting the next car, several of the master relays and the demand registering relays. The function and operation of the circuits shown in this figure are the same as those shown in FIGURE 6 of our copending application.

FIGURE 7

Figure 7:
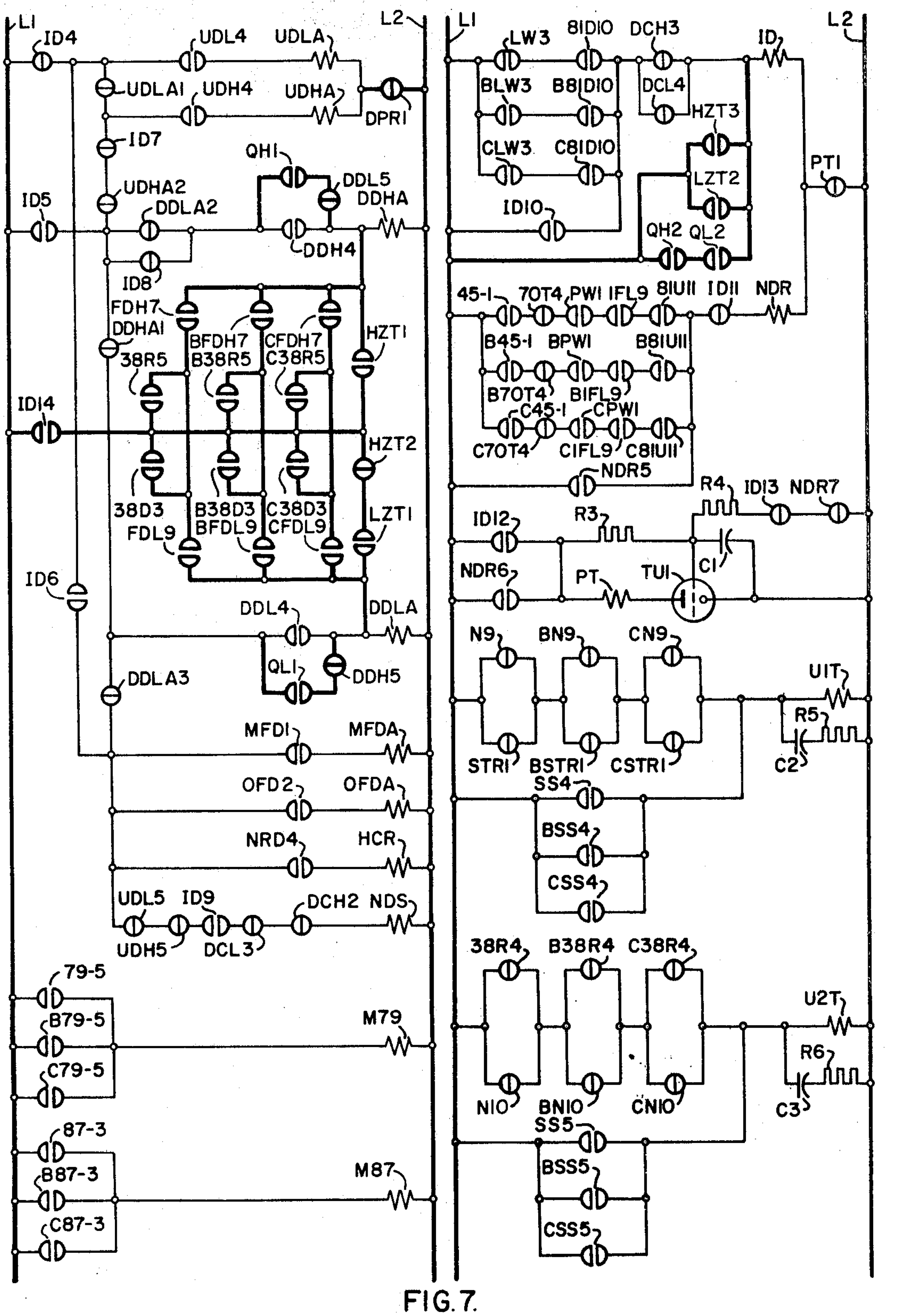

FIGURE 7 illustrates the circuits for the demand preference relays, the master basement and main floor assignment relays, the up peak and down peak relays, the peak traffic timing relay, and the first and second dispatching relays.

As in the system disclosed in our copending application, demands are recognized one at a time to be given preference for the assignment of available cars. When the system is on other than down peak operation (break contacts ID4, ID7 and ID8 remain closed, while make contracts ID5, ID6 and ID14 remain open), up demands are normally given preference over down demands. To illustrate, if an up demand is registered in the low zone (make contacts UDL4 closed), the relay UDLA will be energized to give the demand preference. Energization of the relay UDLA opens the break contacts UDLA1 so that even if other demands are registered they will not be recognized until the up demand in the low zone has been satisfied. This operation is similar to the operation of FIGURE 7 in our copending application, however, the break contacts DPR1 have been inserted in the circuits of the up demand in the low zone and the up demand in the high zone preference relays in accordance with the subject invention. When these contacts are open the up demands cannot be given preference. The circumstances under which the relay DPR is energized will be discussed below.

The only other modification of the preference relay circuits when the system is not operating in down peak is the addition of the contacts of the quota relays in the down demand preference relay circuits. The down demand in the high zone preference relay DDHA, may be energized despite the fact that no down demand is registered in the high zone (make contacts DDH4 open), if the down calls registered in the high zone exceeded the quota for cars serving down calls in the high zone (make contacts QH1 closed) unless a normal down demand in the low zone is registered (break contacts DDL5 open). In like manner the down demand in the low zone preference relay DDLA may be energized despite the fact that there is no down demand registered in the low zone (make contacts DDL4 open), if the number of down calls in the low zone exceeds the quota for cars serving down calls in the low zone (make contacts QL1 closed) unless there is a down demand registered in the high zone (break contacts DDH5 open).

When the system goes into down peak operation the contacts ID4, ID7 and ID8 are open. At the same time the contacts ID5, ID6 and ID14 will be closed. As was demonstrated in the discussion of FIGURE 7 in our prior application, this has the effect of giving down demands preference over the up demands.

As will be seen below, the time that down corridor calls at certain floors remain unanswered is monitored. It will also be seen that if a down corridor call at one of the selected floors remains unanswered for a predetermined length of time, the system will go into down peak operation. For example, if a down corridor call in the lower section of the high zone goes unanswered for a predetermined length of time, the make contacts HZT1 will close. Since as just mentioned this puts the system on down peak operation, the contacts ID14 will also be closed. Hence, the down demand in the high zone preference relay DDHA will be energized whether or not a down demand is registered in the high zone. In a similar manner, if the down corridor call at a selected floor in the lower section of the low zone goes unanswered for a predetermined length of time, the contact LZT1 will be closed to energize the down demand in the low zone preference relay DDLA. If timed out down calls exist in both the high zone and the low zone, the call in the high zone will be given preference since the break contacts HZT2 will be open to prevent energization of the DDLA relay.

As in the system in our copending application, with the system in down peak operation (break contacts ID8 open), preference is alternated between down demands in the high zone and down demands in the low zone with first preference being given to the first down demand to be registered. For instance, if a down demand in the low zone is registered first (make contacts DDL4 closed) the relay DDLA is energized to give down demand in the low zone preference. Energization of the relay DDLA opens the break contacts DDLA2 so that the relay DDHA cannot be energized even if there is a down demand subsequently registered for the high zone (make contacts DDH4 close). When the down demand in the low zone is satisfied the relay DDLA will be deenergized thereby closing the contact DDLA2 which in turn permits energization of the relay DDHA to give the down demands in the high zone preference. Energization of the relay DDHA opens the contacts DDHA1 so that the relay DDLA cannot be energized again until the down demand in the high zone has been satisfied.

This scheme provides more equitable service during periods of heavy down traffic, however, if the assignment of a car should be canceled after the car has been assigned to a particular down demand this equitable satisfaction of down demands would be disrupted. As will be seen, cancellation of an assignment occurs whenever a car call is registered in a car which has been given an assignment. This will occur most frequently when the "next" car, which is standing at the main floor with its doors open, is given an assignment and a passenger enters the car as the door starts to close and registers a car call. Of course, when the assignment is canceled, the demand to which the car was assigned will be reestablished. However, the demand will have lost its preference. In order to correct for this, the present invention provides for reestablishment of the preference of a down demand canceled by a car call during down peak operation. For example, assume that down demands are registered in both the high zone and the low zone but that the down demand in the high zone is registered first so that the relay DDHA is energized. Assume that the elevator car A which is standing at the first floor with its doors open is assigned to answer the down demand in the high zone. This will result in cancellation of the down demand in the high zone (make contacts DDH4 open) and closing of the make contacts FDH7. Assume further, as the doors of the A car begin to close, that a passenger enters the car and registers a car call for any floor above the main floor (make contacts 38R5 closed). Drop out of the contacts DDH4 results in deenergization of the relay DDHA. With the closing of the contacts 38R5 following a circuit established to reenergize relay DDHA:

L1, ID14, 38R5, FDH7, DDHA, L2

Registration of the car call results in cancellation of the assignment, however, the contacts FDH7 have a delay in dropout of sufficient duration to maintain energization of the relay DDHA until deenergization of the relay FDH permits reenergization of the down demand in the high zone relay to close the contacts DDH4.

In a similar manner, if a down demand in the low zone had been given preference and an up car call was registered in the A car which had been assigned to satisfy the down demand in the low zone, the down demand in the low zone would be given preference again through the contacts FDL9. Since the assignment of a car could be canceled by a car call when the car was at a floor above the main floor, or if at the main floor when a passenger pressed a car call button for the basement, make contacts 38D3 are also included in the circuit to ensure reestablishment of the preference when a car call is registered for a floor below the car.

As was mentioned above, the system will be put into down peak operation by energization of the relay ID if a timed out down call exists (make contacts HTZ3 or LZT2 for the high zone and the low zone respectively are closed). In addition, the system will operate on down peak operation if the quota of down calls is exceeded in both the high zone (make contacts QH2 closed) and the low zone (make contacts QL2 closed).

FIGURE 8

This figure discloses the circuits for the assignment relays which when energized serve to initiate the dispatch of a car to satisfy a specific demand for service. It should be noted that break contacts of the car call above relay (38R6) and the car call below relay (38D4) are inserted in the L2 bus so that registration of a car call results in cancellation of any car assignment. This is done to give car calls priority over demands for service. With the assignment canceled, the demand will be reestablished and another car will be assigned to serve that demand.

Figure 8:
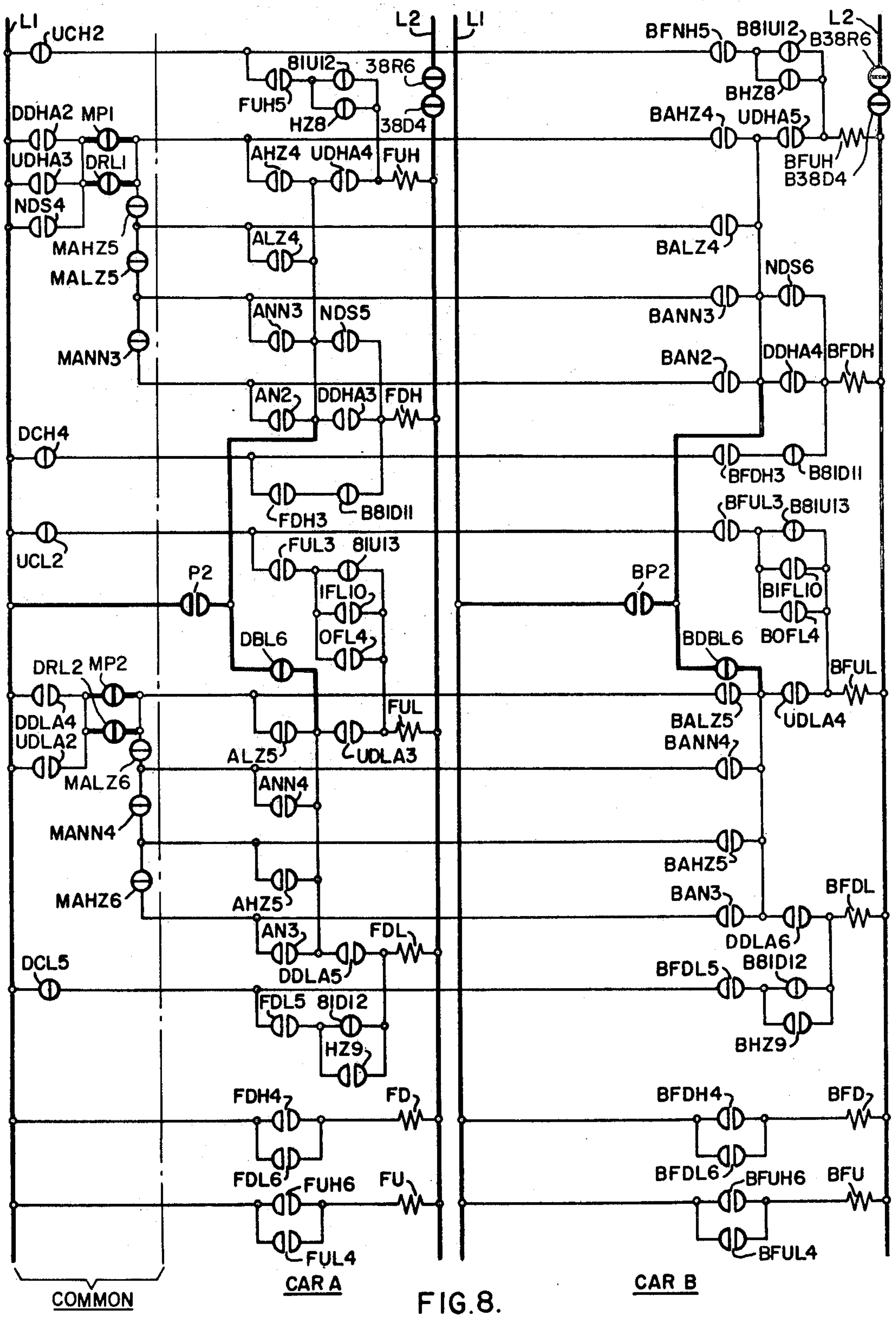

The remaining additions to FIGURE 8 effect the assignment of a car proceeding to the parking floor to demands for service. It will be shown below that a car will only be assigned to precede to the parking floor when it becomes available under certain conditions at the main floor. It will be remembered from the description of FIGURE 1 that the parking floor has arbitrarily been selected as the lowest floor in the high zone which in this case is the sixth floor. It will also be shown below that the parking relay is only energized while the car is proceeding to the parking floor. With these conditions in mind, the circuits of FIGURE 8 can now be considered. Since a car is sent to park because it is idle, and since it is already in motion, the invention proposes that the parking car be considered first for assignment to a demand which arises while the car is proceeding to the parking floor. Therefore, it is necessary to suspend the assignment of other cars until it is determined whether the parking car is in position to answer the particular demand. Accordingly, whenever a car is proceeding to the parking floor, the break contacts MP1, MP2 of the master parking relay are open to interrupt normal energization of the assignment relays for the high zone and low zone, respectively, if the contacts DRL1 and DRL2 are open. The DRL contacts open when a demand is registered, and reman open for a predetermined period of time sufficient to permit assignment of the parking car if it is in a position to answer the demand. If the parking car is not in position to satisfy the demand, at the end of the prescribed time the contacts DRL1 and DRL2 will close to permit the assignment of an available car to the demand in a manner described in detail in the discussion of FIGURE 8 in our copending application.

Assume that the elevator car A has been assigned to park (make contacts P2 closed). As will be seen below, this will result in the opening of the break contacts MP1 and MP2. Assume further that a demand for service in the up direction in the high zone is registered. Again, as will be seen below, the contacts DRL1 and DRL2 will open. Since there is an up demand in the high zone, and assuming it has been given preference, the make contacts UDHA4 will also be closed. As will be seen from FIGURE 8, the elevator car A will be assigned to the up demand in the high zone by energization of the relay FUH through the following circuit:

L1, P2, UDHA4, FUH, L2

Since as was mentioned above, the lowest floor in the high zone has been arbitrarily selected as the parking floor for purposes of illustration, if the elevator car A is proceeding to the parking floor it is traveling in the up direction and is necessarily below all up calls in the high zone. Therefore, the parking car will always be assigned to the up demand in the high zone. Similarly, if the demand had been a down demand in the high zone (make contacts DDHA3 closed) the parking car would also have been assigned to the demand since the car is necessarily below all the down demands in the high zone. In this case the elevator car A would have proceeded to the highest down demand in the high zone and reversed direction.

As for demands for service in the low zone, the assignment to those demands of a car proceeding to the parking floor depends on the position of the car relative to the corridor calls. Considering first down demands in the low zone, if the car proceeding to the parking floor, which it will be remembered is traveling in the up direction, has not yet passed the highest down call in the low zone creating the demand, it is in position to serve all of the down corridor calls in the low zone. Hence, if there are down calls in the low zone above the elevator car A as it is proceeding to the parking floor, the break contacts DBL6 will be closed. When the down demand in the low zone is given preference (make contacts DDLA5 closed) the elevator car A will be assigned to the down demand in the low zone by energization of the relay FDL through the following circuit:

L1, P2, DBL6, DDLA5, FDL, L2

On the other hand, if the elevator car A while preceding to the parking floor is above all of the down corridor calls in the low zone, it is not necessarily in the best position to serve these calls, and therefore under these circumstances the car will not be assigned to the down demand in the low zone, but will proceed to the parking floor. Under these conditions the car cannot be assigned to down demands in the low zone because the contacts DBL6 will be open. At the end of the predetermined delay period, the contacts DRL2 will close to permit the assignment of an available car to the down demand in the low zone.

As for up corridor calls in the low zone, no special provisions need be made as will be discussed under "Operations," a car proceeding up to the parking floor will stop for all up corridor calls ahead of it.

The circuits of FIGURE 8 are appropriate for assigning a car proceeding to the parking floor to demands for service when the lowest floor in the high zone is designated as the parking floor. Of course, as mentioned previously, anv floor may be selected as the parking floor. Modifications of the circuits of FIGURE 8 so that a car proceeding to the parking floor can be assigned to demands which it is in position to satisfy when some floor other than the lowest floor in the high zone is selected as the parking floor could be made by one skilled in the art in light of the disclosure herein made.

FIGURE 9

Figure 9:
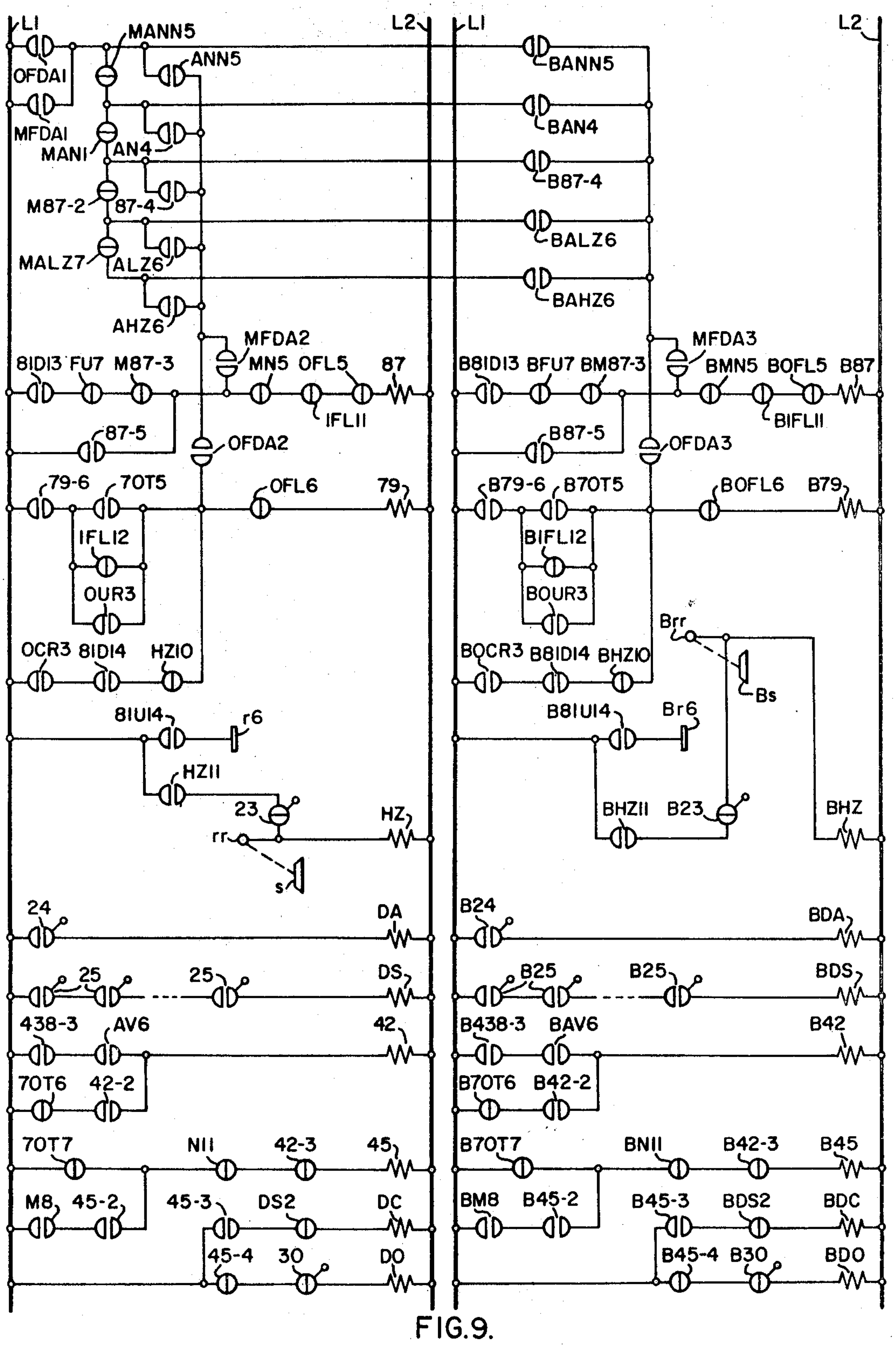

FIGURE 9 illustrates the circuits for the relay assigning cars to the main floor and the basement in addition to the circuits for the high zone relay and the door operating relays. The only modification to these circuits is that since the high zone in the system described begins at the sixth floor, the contact segments on the floor selector for the high zone relay HZ are labeled *r*6.

FIGURE 10

This figure shows the circuits for the up and down preference relays, the car call above and below relays and the auxiliary running relay. Modifications to this figure include the addition of car call contacts 8CR2 and 9CR2 and the addition of means for initiating movement of the parking car to proceed to the parking floor. Since it was mentioned that a car will only be assigned to park when it is at the main floor, and since the parking floor has been selected as the sixth floor, the car must be made to travel in the up direction in order to park. Hence, the make contacts P3 have been added to energize, through the following circuit, the up preference relay and the auxiliary running relay 81U which in turn initiates upward movement of the car:

L1, P3, 81D15, TFL2, 81U, 81, L2

The 81U and 81 relays will be held in through the P3 contacts and through the following holding circuit:

L1, AV7, FD7, FU8, 81U15, 81D15, TFL2, 81U, 81, L2

When the floor selector of the elevator car A notches into the parking floor, the contacts P3 will open and when the doors of the car close the break contacts AV7 of the available car relay will open to interrupt energization of the up preference relay.

FIGURE 11

This figure illustrates the circuits for the high zone and low zone quota relays, the high and low zone timer relays, the lower section demand relays for the high and low zone and the down call reference relays for the high and low zone.

The high zone quota relay, QH, is energized whenever another car is needed to answer down corridor calls in the high zone. In order to more expeditiously handle down corridor calls, it has been determined that each car should only be expected to serve a certain number, termed a quota, of calls. If the number of calls existing exceeds the quota, another car should be dispatched to help out. Although a quota may be set at any number of down corridor calls, for purposes of illustration two down corridor calls will comprise a quota. In other words, if two or less down corridor calls exist the relay QH will not be energized because one car will be adequate to handle the down calls registered. However, if three down corridor calls are registered in the high zone and only one car is assigned to down demands in the zone or is traveling down in the zone, the relay QH will be energized to indicate that the quota has been exceeded and that another car should be assigned to serve down corridor calls in the high zone. The relay QH will be energized even though no car has yet been assigned to the high zone because it is evident that more than one car will be needed.

It will be observed that the energizing circuit for the relay QH includes an electronic tube TU2. It will also be noted that conduction of current by this tube is controlled by a bridge circuit. This tube may be of the cold-cathode type or the high-vacuum, hot-cathode type. However, for present purposes it will be assumed that the tube TU2 is a gaseous-discharge tube of the hot-cathode type commonly known as a thyratron.

The tube TU2 has a control electrode which is connected to the junction of two resistors R7 and R8. These resistors are part of a voltage divider comprising resistors R7 through R11, which are connected in series across the busses L1 and L2. The resistors R8 through R11 are all of equal resistance, a typical value being 10,000 ohms. The resistance of R7 is twice that of resistors R8 through R11 or, for the example given, 20,000 ohms.

The tube TU2 also has a cathode electrode which is connected to the junction of two resistors R12 and R13, which likewise form a voltage divider comprising serially-connected resistors R12 through R17 connected directly between the busses L1 and L2. The resistors R12 through R16 are of equal value which should be the same as the value of the resistor R7 or 20,000 ohms. The resistor R17 should have the same value as resistors R8 through R11 or 10,000 ohms.

The anode electrode of the tube TU2 is connected to the high quota relay QH. Anode electrode voltage for the tube TU2 is supplied by the secondary winding of a transformer TR1 whose primary winding is energized by any suitable alternating-current source of energy (not shown). It will be assumed that the TU2 conducts current or fires when zero or a positive bias is applied to its control electrode.

It is evident from inspection of FIGURE 11 that through the manipulation of a number of contacts, various combinations of resistance can be introduced into the voltage divider circuits affecting the voltage on the control grid and cathode respectively of the tube TU2. The two voltage divider circuits therefore comprise a bridge network. When the bridge is balanced or the control grid is at a higher voltage than the cathode, the tube TU2 will conduct, thereby energizing the relay QH.

In order to demonstrate the operation of the circuit, assume first that no down calls are registered in the high zone (break contacts 6DR6 through 9DR6 of the down corridor call relays for the sixth through ninth floor are closed). Under these circumstances, all of the resistors R8 through R11 are shunted and the potential on the control grid will be the voltage on L2, the negative bus. Assume further that no cars are assigned to down demands in the high zone and that no cars are traveling down in the high zone. In terms of the contacts operative in the voltage divider connected to the cathode of the tube TU2, this means that the contacts FDH8, BFD8 and CFDH8 of the high zone demand assignment relays of the A, B and C cars are all closed while the make contacts FDH9, BFDH9 and CFDH9 of the same relays are all open. Assuming further, for the moment, that none of the cars are in the high zone, the break contacts HZ14, BHZ14 and CHZ14 associated with the A, B and C cars respectively are all closed while the make contacts HZ15, BHZ15 and CHZ15 are all open. Under the operating conditions just described then, the resistors R13, R14 and R15 will be shunted while the resistor R16 will be inserted in the circuit. Therefore, the lower voltage divider includes the resistors R12, R16 and R17. Remembering that R12 and R16 have a value of 20,000 ohms each and R17 has a value of 10,000 ohms, the voltage on the cathode of the tube TU2 will be six-tenths of the voltage rise between L2 and L1. Since as was stated above with no down corridor calls registered in the high zone, the voltage on the grid is equal to the voltage on L2, the tube TU2 will be negatively biased and will not conduct. Consequently, the relay QH will be deenergized.

Assume now that a down corridor call is registered at the sixth floor. This results in the opening of the break contacts 6DR6 thereby introducing the resistance R8 into the control grid voltage divider. Since it was stated that in the preferred embodiment the resistor R8 has a value of 10,000 ohms, while the resistor R7 has a value of 20,000 ohms, the voltage on the control grid of the tube TU2 will be one-third of the voltage rise from L2 to L1. Since it was just stated that the voltage on the cathode of TU2 was six-tenths of the voltage rise from L2 to L1, the tube is still negatively biased and will not conduct. Registration of another down corridor call in the high zone results in introduction of another 10,000 ohms into the upper voltage divider. Since this only raises the voltage on the grid to one-half the voltage rise from L2 to L1, the relay QH will remain deenergized. If a third down corridor call is registered in the high zone so that another 10,000 ohms is introduced into the upper voltage divider, the voltage on the grid is raised to six-tenths of the voltage rise from L2 to L1. This creates zero bias on the tube TU2 which in turn will fire thereby energizing the relay QH. In terms of the elevator problem involved, three down corridor calls in the high zone when no car is assigned to down demands in the high zone or is travelling down in the high zone, causes the relay QH to be energized thereby indicating that more than one elevator car is needed to answer the down corridor calls in the high zone.

Assume now that the elevator car A is assigned to serve down corridor calls in the high zone. Energization of the assignment relay will result in the opening of the break contacts FDH8 and closing of the make contacts FDH9. This introduces the resistor R13 into the lower voltage divider circuit and shunts the resistor R16. Since the value of the resistor R13 is equal to the value of the resistor R16 (both 20,000 ohms), the voltage on the cathode of the tube TU2 remains unchanged and equal to six-tenths of the voltage rise between L2 and L1. Therefore, with three down corridor calls registered in the high zone and only one car assigned to answer those calls, the relay QH remains energized to indicate a need for another car.

Consider now that the down calls are registered at the sixth, seventh and eighth floors, and that the elevator car B becomes available at the ninth floor. If it is assigned to down corridor calls in the high zone, the break contact BFDH8 will open thereby introducing the resistor R14 into the lower voltage divider circuit. Now the lower voltage divider circuit comprises resistors R12, R13, R14 and R17. Since the value of R14 is also 20,000 ohms the voltage on the cathode of the tube TU2 now rises to a little over seven-tenths of the voltage rise from L2 to L1. When the B car is assigned to down demands in the high zone, the contacts BFDH9 also close, however, this does not effect operation of the circuit, since the resistor R16 is already shunted by the contacts FDH9. When the elevator car B starts to move down to answer the down corridor calls below it, the down demand in the high zone assignment relay drops out (see explanation of FIGURE 8 in our copending application). However, with the car in the high zone, the contacts BHZ14 are open and as the car becomes conditioned for down travel the down contacts B81D17 also open. Therefore, even though the contacts BFDH8 close, the resistor R14 will not be shunted. At the same time the make contacts B81D18 and BHZ15 ensure that the resistor R16 remains shunted. The resistor R16 will be shunted anytime at least one car is assigned to down corridor calls in the high zone or at least one car is traveling down in the high zone. If a car is assigned to down demands in the high zone or is traveling down in the high zone, the circuit shunting at the resistor associated with that car is open, while at the same time contacts associated with that car close to shunt the resistor R16. If no cars are assigned to down demands in the high zone or traveling down in the high zone, all the resistors associated with the individual cars are shunted, while the shunting circuits associated with each car around the resistor R16 are all open. It can thus be seen that if there are more than two calls registered in the high zone per car assigned to down demands in the high zone or traveling down in the high zone, the relay QH will be energized, thus indicating the need for another car.

The low zone quota relay QL, which can be found in the anode circuit of the tube TU3, operates in a manner substantially similar to the operation of the relay QH. The resistors R18 and R23 through R27 are all of equal value, for instance, 20,000 ohms. The resistors R19 through R22 and R28 are all equal to one-half of the value of R18 or 10,000 ohms. The voltage on the control grid of the tube TU3 is proportional to the number of down corridor calls registered in the low zone. Whenever a down corridor call is registered in the low zone, the corresponding contacts of the down call registering relay open to introduce the associated resistor R19 through R22 into the control grid voltage divider circuit. For instance, if a down corridor call is registered at the third floor, the contacts 3DR6 open to introduce the resistor R20 into the voltage divider.

Similar to the high zone quota circuit, the resistors R24 through R26 are individually introduced into the cathode voltage divider circuit connected to the tube TU3 if the elevator cars A through C respectively are either assigned to down corridor calls in the low zone, or the car is traveling down in the low zone. For instance, if the A car is assigned to the down corridor calls in the low zone, the contacts FDL10 will open thereby opening the shunting circuit around the resistor R24. If the elevator car A is not assigned to down demands in the low zone, but is traveling down (break contacts 81D19 open), is not in the high zone (make contacts HZ16 open), is not at the first floor (make contacts IFL15 open) and is not in the basement (make contacts OFL9 open), it must be in the low zone and is therefore considered in position to be answering down corridor calls in the low zone. As was the case of the high zone quota circuit, when no cars are assigned to down demands in the low zone and no car is traveling down in the low zone, the resistor R27 will be introduced into the cathode voltage divider circuit since all of the circuits shunting R27 will be open. Whenever at least one car is either assigned to down demands in the low zone or traveling down in the low zone, contacts complementary to those which introduce the resistors R24 through R26 into the voltage divider circuit will shunt the resistor R27. The resistor R28 being of a value of 10,000 ohms ensures that the tube TU3 will only fire when three down corridor calls in the low zone are registered if there are no cars or one car.

The high zone down call reference relay DHZ is energized whenever a down corridor call is registered at a selected floor in the lower section of the high zone. For purposes of illustration, the seventh floor has been selected as the reference floor for down corridor calls in the high zone. Hence, a jumper is shown connecting the coil DHZ to the contacts of the seventh floor down corridor call relay (make contacts 7DR7). Whenever a down corridor call is registered at the seventh floor then, the relay DHZ will be energized.

Similarly, the relay DLZ is energized whenever a down corridor call is registered for the reference floor in the low zone. The second floor has been selected in the example shown by connecting the coil DLZ with a jumper to the make contacts 2DR7 of the second floor down corridor call relay.

The down call reference relays are utilized to time the duration of calls at the selected floors so that passengers awaiting down elevator service in the lower sections of the high and low zones are not neglected. Since cars are normally dispatched to go to the highest down call in the zone first, it often happens during periods of heavy down traffic that the cars become loaded to capacity at the higher floors and therefore bypass the lower floors in the zone even though down corridor calls are registered at those floors.

The relay HZT is energized when a down corridor call at the selected floor in the high zone has remained unanswered for a prescribed period of time. The timing circuit is similar to that employed in the peak timer of FIGURE 7. Although the tube TU4 may be of any suitable type and may be either of a high-vacuum or the gaseous discharge type, in the preferred embodiment of the invention the tube TU4 is a gaseous discharge tube of the type known as a thyratron. The thyratron may be either of the cold-cathode or of the hot-cathode type. For present purposes, it will be assumed that are are of the former type.

In operation, the voltage on the control grid of the tube TU4 much reach some predetermined positive value above the voltage on the cathode before the tube will conduct. During the timing sequence, the voltage on the control grid is controlled by the capacitor C2. When the high zone down call reference relay DH6 is energized by the registration of a down corridor call at the selected floor, the contacts DHZ1 close. The capacitor C2 will then begin to charge through the charging resistor R29. A suitable combination between the values of R29 and C2 determine the length of time it will take for the control grid voltage to reach the firing voltage. Although any period of time may be selected, a representative period is sixty seconds. When the voltage on the capacitor C2 reaches the firing voltage of the tube TU4, the tube will conduct thereby energizing the relay HZT. When it is fired, the tube will continue to conduct until the anode circuit is interrupted. When a car is assigned specifically to serve down corridor calls in the lower section of the high zone, the break contacts MATH1 of the master lower section of high zone assignment relay will open to deenergize the relay HZT. When the down corridor call at the reference floor is answered, the contacts DHZ2 will close providing a discharge circuit through the resistor R30 for the capacitor C2, thereby resetting the timer.

Energization of the relay HZT results in closing of the contacts HZT4 to complete a circuit for the energization of the high zone lower section demand relay HZD. This relay will also be energized if the quota in the high zone is exceeded (make contacts QH3 closed) and there is a down corridor call registered at at least one of the floors in the lower section of the high zone (either make contacts 6DR8 or 7DR8 closed), as long as there is no normal down demand registered for the high zone (break contacts DDH6 closed) and no car has yet been assigned to down corridor calls in the lower section of the high zone (break contacts MATH2 closed).

The low zone timer relay LZT and the low zone lower section demand relay LZD operate in a manner similar to that of their high zone counterparts. When a down call is registered at the low zone reference floor, the contacts DLZ1 close to intiate charging of the capacitor C3 through resistor R31. When the potential on the capacitor C3 reaches the firing voltage of the tube TU5, the tube conducts, thereby energizing the coil LZT. The timer is reset by the discharge of the capacitor C3 through resistor R32 when the call at the reference floor is canceled (break contacts DLZ2 close). Closing of the make contacts LZT3 provides a circuit for energization of the low zone later section demand relay LZD. This relay is also energized if a quota is exceeded in the low zone (make contacts QL3 closed), if no car is assigned to down corridor calls in the low zone or in a position to satisfy a down demand in the low zone (make contacts DDLC3 closed), providing that a down corridor call is registered at one of the floors in a lower section of the low zone (make contacts 2DR8 and/or 3DR8 closed) and no car has yet been assigned to down corridor calls in the lower section of the low zone (break contacts MATL2 closed).

FIGURE 12

This figure discloses the circuits for the relays which assign a car to the lower half of the high zone and to the lower half of the low zone, in addition to the circuits for the relays which indicate that a car is above the lower section of the high zone and above the lower section of the low zone. The figure also shows the circuit for the energization of the parking relay. All the relays illustrated in this figure are individual to each car.

Energization of the relay ATH effects assignment of the A elevator car to down corridor calls in the high zone. In order for the energizing circuit to be completed, the elevator car A must be assigned to down demands in the high zone (make contacts FDH10 closed) it must be available (make contacts AV9 closed) and there must be a demand for down service in the lower section of the high zone (make contacts HZD1 closed). Since the assignment of the elevator car A to down demands in the high zone drops out the available car relay, the circuit just described will only provide an energizing pulse for the relay ATH. However, energization is maintained through the holding contacts ATH3 and the break contacts G2 of the holding relay. The contacts G2 will remain closed until the elevator car A notches into the floor at which the highest down corridor call in the lower section of the high zone is registered. At this time the contacts G2 will open thereby deenergizing the relay ATH.

The relay ATL is energized in a similar manner however, it effects assignment of the elevator car A to down corridor calls in the lower section of the low zone. In order for it to be initially energized, the car must be assigned to down demands in the low zone (make contacts FDL11 closed), it must be available (make contacts AV10 closed) and there must be a demand for down elevator service in the lower section of the low zone (make contacs LZD1 closed). The holding circuit is maintained through the break contacts G3 and the holding contacts ATL3 until the car notches into the floor at which the highest down corridor call in the lower section of the low zone is registered.

When energized the relay ALH indicates that the elevator car A is above the lower section of the high zone. Since the lower section of the high zone in the specific embodiment under consideration comprises the sixth and seventh floors, the relay ALH is energized when the floor selector of the elevator car A notches into the eighth floor position traveling in the up direction. Under these conditions, the make contacts 81U17 are closed and the brush *vv* on the carriage of the floor selector comes into contact with the segment *v*8. Once energized the relay ALH remains energized through the holding contacts ALH3 and the normally closed switch 26 as long as the car remains at or above the eighth floor. On descent, as the floor selector of the elevator car notches into the seventh floor position, the cam *v'* is effective to open the normally closed switch 26 to break the holding circuit for the relay ALH. Thereafter, as long as the elevator car A remains below the eighth floor position, the relay ALH will remain deenergized.

The relay ALL indicates, when it is energized, that the elevator car A is above the lower section of the low zone. It is picked up in a manner similar to that in which the relay ALH is energized except that the energizing circuit is completed through the make contacts 81U18 of the up preference relay when the brush *zz* comes into contact with a segment *z*4 as the floor selector notches into the fourth floor position. Energization is maintained through the holding contacts ALL3 and a normally closed switch 27. During descent when the floor selector notches into the third floor position, the cam *z'* will open the switch 27 to deenergize the relay ALL. Therefore, the effect is that if the elevator car A is at or above the fourth floor the relay ALL will be energized and if it is at or below the third floor the relay ALL will be deenergized.

The parking relay P is energized if the elevator car A is assigned to precede to the designated parking floor. As was discussed in our copending application, cars can become available at any floor at which they complete a call.

In this manner cars become randomly spaced so that a prospective passenger will not have to wait long for a car to arrive when he registers a corridor call at any floor. The situation can arise, however, where most of the cars complete their trips at the main floor. It is proposed herein that under these circumstances one car be sent to an intermediate floor to be available for quicker dispatch to serve calls which subsequently become registered at floors above the main floor.

The car will only be sent to park if it is available (make contacts AV11 closed) at the first floor (make contacts 1FL17 closed) and it not designated as the next car (break contacts N12 closed) nor the non-next available car (break contacts ANN6 closed). In addition there must be no demands for service registered (break contacts MD1 closed) at the time the car is to be dispatched to the parking floor. When all these conditions are met the parking relay P will be energized. The relay P will remain energized as the car departs the first floor (make contacts 1FL17 open) through the holding contacts P4. The relay P will therefore remain energized until the car reaches the parking floor or an intermediate floor at which an up corridor call is registered or until the car, while enroute to the parking floor is assigned to up demands (break contacts FU10 open) or to down demands (break contacts FD9 open). If a car is assigned to demands or stops for the up corridor call in the low zone, it loses its assignment to proceed to the parking floor.

FIGURE 13

FIGURE 13 illustrates the circuits for the master car running up relay, the down demand preference relay, the up call timer relay, the assignment delay relay and several master relays including the master parking relay, the master demand relay, the master lower section of high zone assignment relay and the master lower section of the low zone assignment relay.

The master car running up relay MCRU is energized if there is at least one car, for instance the A car, set for up travel (make contacts 81U19 closed), which is not assigned to down demands (break contacts FD10 closed) and is not in the basement (break contacts OFL11 closed), as long as there is a demand for down elevator service (either make contacts DDL6, DDH7, MFD2 or OFD3 closed). If these conditions are met, the down preference relay DPR will also be energized through the diode D17. The down preference relay DPR will be held in if a down demand is registered in either the high zone or the low zone (either make contacts DDH8 or DDL7 closed) through the holding contacts DPR2 as long as the up call timer relay has not timed out (break contacts UCT1 closed). The relay DPR may also be energized through the contacts QH4 and QL4 if quotas are exceeded in both the high zone and the low zone whether or not an up call has gone unanswered for a predetermined period of time.

The up call timer relay UCT operates in a manner similar to that of the high zone timing relay HZT and the low zone timing relay LZT shown in FIGURE 11. When the charging circuit for the capacitor C4 has been completed for a long enough period of time to permit the voltage on C4 to build up to the firing voltage of the tube TU6, the tube conducts and the relay UCT is energized. The timer begins to time out when an up corridor call is registered in the high zone (break contacts UCH3 closed) or the low zone (break contacts UCL3 closed) if there are no cars serving up calls (break contacts MCRU1 closed). When a car enters up service the contacts MCRU1 open and the relay UCT is dropped out. The timer is then reset by the discharge of the capacitor C4 through the resistor R16 and the make contacts MCRU1. The up call timer will also be reset if the up calls are canceled. The timer will not time out even if the relay MCRU is deenergized unless there is an up call registered in at least one zone. A suitable time for this timer is 15 seconds, although any desired time may be set.

The assignment delay relay DRL is normally energized. It will be remembered that break contacts of this relay are used to suspend normal assignment of available cars to demands when a car is assigned to park. The circuit for energization of the relay DRL is completed through the break contacts MP3 as long as no car is assigned to park. If any car is assigned to proceed to the parking floor, the contacts MP3 will open. However, the circuit will still be completed for the energization of the relay through the break contacts MD2 as long as no demands are registered. Registration of a demand results in the opening of the contacts MD2 of the master demand relay, however, relay DRL will not drop out immediately. The relay will remain energized for a period of time sufficient to permit the assignment of the parking car to the demand if it is in position to serve the calls. The delay in drop-out can be accomplished in any suitable manner, such as the shunt circuit comprising capacitor C5 and resistor R17.

When activated the master parking relay MP indicates that a car is proceeding to the parking floor. It is energized through the make contacts P5 of the individual parking relays.

The master demand relay MD is energized through make contacts of the up or down demand relays for the high or low zone or by make contacts of the basement demand relay (contacts UDH6, UDL6, DDH9, DDL8 and OFD4 respectively). Since contacts of the master demand relay are used in conjunction with the parking relays when there can be no main floor demand, contacts of the main floor demand relay are not included in the circuits for energization of the master demand relay.

The master lower section of high zone assignment relay, MATH, when energized indicates that a car has been assigned to serve down corridor calls in the lower section of the high zone. It is energized by make contacts of the individual car assignment relays.

The master lower section of low zone assignment relay MATL performs in a similar manner to indicate that a car has been assigned to serve down corridor calls in the lower section of the low zone only.

OPERATION

From the drawings illustrating the invention and from the foregoing discussion, in which the figures of the drawing are discussed in detail, it is possible to trace the operation of the elevator system in response to various demands for elevator service. Because of the complexity of the system, however, it will be helpful at this stage to describe a number of respresentative operations thereof. In order to simplify the presentation, the opening or closure of certain contacts upon pickup or dropout of the associated relay, solenoid or switch will not be discussed if such contact operation has not immediate or prospective effect under the conditions then being considered.

As was mentioned previously, this application is a continuation-in-part of our copending application. Therefore, basic operations of the system which were described in detail in that application will not be repeated here. For a complete description of these operations, reference should be made to the copending application. Where particular operations there described are necessary for an understanding of the present invention, a brief outline of that operation will be given.

QUOTAS AND TIMED OUT CALLS

Assume for purposes of illustration that all three elevator cars are available for service and that the A car is available at the parking floor, the sixth floor which is the lowest floor in the high zone, while the B and C cars are available at the main floor. To become available a car must be standing at a floor, and have no car calls or corridor calls ahead of the position of the car in the direction in which the car had been conditioned to travel. Under these conditions the available car relays AV, BAV and CAV of the elevator cars A, B and C respectively will be energized (see FIGURE 3). For a more precise description of the conditions under which cars become available, refer to our copending application. Since the elevator car A is the first car to become available in the high zone, it will be further designated as the high zone available car by energization of the relay AHZ in FIGURE 3. It will be further assumed that the elevator car C at the first floor has been designated as the next car by the energization of the relay CN in FIGURE 6. Since the C car is also available the next available car relay CAN (not shown in FIGURE 3) will be energized. This will leave the elevator car B to be designated as the non-next available car through energization of the relay BANN in FIGURE 3.

Assume that a down corridor call is registered at the ninth floor (relay 9DR in FIGURE 2 energized). Opening of the contacts 9DR2 in FIGURE 4 will result in deenergization of the relay DCH to indicate the presence of a down call in the high zone. Referring to FIGURE 6, it can be seen that a down demand in the high zone will be registered through energization of the relay DDH since the down call is registered (contacts DCH1 closed) no car is assigned to down calls in the high zone (contacts FDH2, BFDH2 and CFDH2 all closed) no car is in position to satisfy the call (none of the cars are traveling down so 81D8 contacts for all the cars are closed) and no car will soon be in position to take the calls (no cars are traveling up so that the contacts MHU1 are closed). Since the down demand in the high zone is the only demand registered it will be given preference by energization of the relay DDHA in FIGURE 7. Closing of the contacts DDHA2 and DDHA3 in FIGURE 8 results in assignment of the elevator car A to the demand by the energization of the relay FDH through the AHZ4 contacts of the A car available in the high zone relay. The elevator car A will therefore depart the sixth floor for the ninth floor in a manner described in detail in our copending application. Pickup of the relay FDH results in cancellation of the down demand in the high zone through the opening of the contacts FDH2.

Consider now that as the elevator car A is proceeding to the ninth floor, down corridor calls are registered at the eighth and seventh floors. Since the down call at the ninth floor has not yet been answered, this results in there being three down corridor calls registered in the high zone. Since it was posited that two corridor calls would be allocated per car, the quota of down calls has been exceeded. It can be seen from FIGURE 11 that registration of the down corridor call at the ninth floor resulted in the opening of the break contacts 9DR6 thereby inserting the resistor R11 into the grid voltage divider circuit of the tube TU2. Where the registration of down corridor calls at the eighth and seventh floors, resistors R10 and R9 are introduced into this circuit in a similar manner. Therefore, the voltage divider controlling the voltage on the control grid of the tube TU2 is comprised of the resistors R7 and R9 through R11. Since it was stated that R7 has a value of 20,000 ohms and R9 through R11 have a value of 10,000 ohms each, the voltage on the control grid of the tube TU2 will be equal to six-tenths of the voltage rise from L2 to L1. Considering the voltage divider controlling the voltage on the cathode of tube TU2, the assignment of the A elevator car to down demands in the high zone resulted in opening of the break contacts FDH8 of the down demand in the high zone assignment relay. This in turn introduced the resistor R13 into the voltage divider circuit. At the same time the contacts FDH9 closed to shunt the resistor R16. The voltage divider in the cathode circuit therefore comprises the resistors R12, R13 and R17. Since it was stated that the values of R12 and R13 are 20,000 ohms each and R17 is 10,000 ohms, the potential on the cathode of tube TU2 is six-tenths of the voltage rise between L2 to L1. Consequently with three down corridor calls in the high zone, and one car assigned to answer them, the bias on the tube TU2 is zero and the tube will conduct thereby energizing the quota relay QH.

With the cancellation of the down demand in the high zone by the assignment of the A car, the contacts DDH4 in FIGURE 7 open deenergizing the relay DDHA. However, with the energization of the relay QH the contacts QH1 close to reenergize the relay DDHA as long as no down demand is registered in the low zone (contacts DDL5 remain closed). By reference to FIGURE 8 it will be seen that with the contacts DDHA2 and DDHA4 closed, the B elevator car will be assigned to down demands in the high zone by energization of the relay BFDH through the contacts BANN3 of the non-next available car relay. Assuming that the A car is still traveling up to the ninth floor, the down demand in the high zone assignment relay for both the A and the B cars are energized simultaneously.

It will be observed that the high zone lower section demand relay, HZD (shown in FIGURE 11), will be energized to indicate that the available car assigned to take care of the excess calls in the high zone should answer just those calls in the lower section of the high zone. Although there are also down calls in the upper section of the high zone, the A car has been dispatched to proceed to the highest down call; therefore no down demand exists in the high zone. Since in addition, the quota of down calls per car assigned to down calls in the high zone has been exceeded, a down corridor call is registered for the seventh floor, and no car has yet been assigned to the lower section of the high zone, the high zone lower lection demand relay HZD will be energized through the following circuit:

L1, DDH6, QH3, 7DR8, MATH2, HZD, L2

Since the elevator car B is assigned to down demands in the high zone and since there is a demand for down elevator service in the lower section of the high zone, the relay BATH in FIGURE 12 will be energized through the contacts BAV9 of the available car relay. The energization provided by this circuit will be just a pulse since the pickup of the FDH relay will deenergize the available car relay (see FIGURE 3). The relay BATH will remain energized, however, through the holding circuit comprising the holding contacts BATH3 and the break contacts BG2 of the holding relay.

Figure 10:
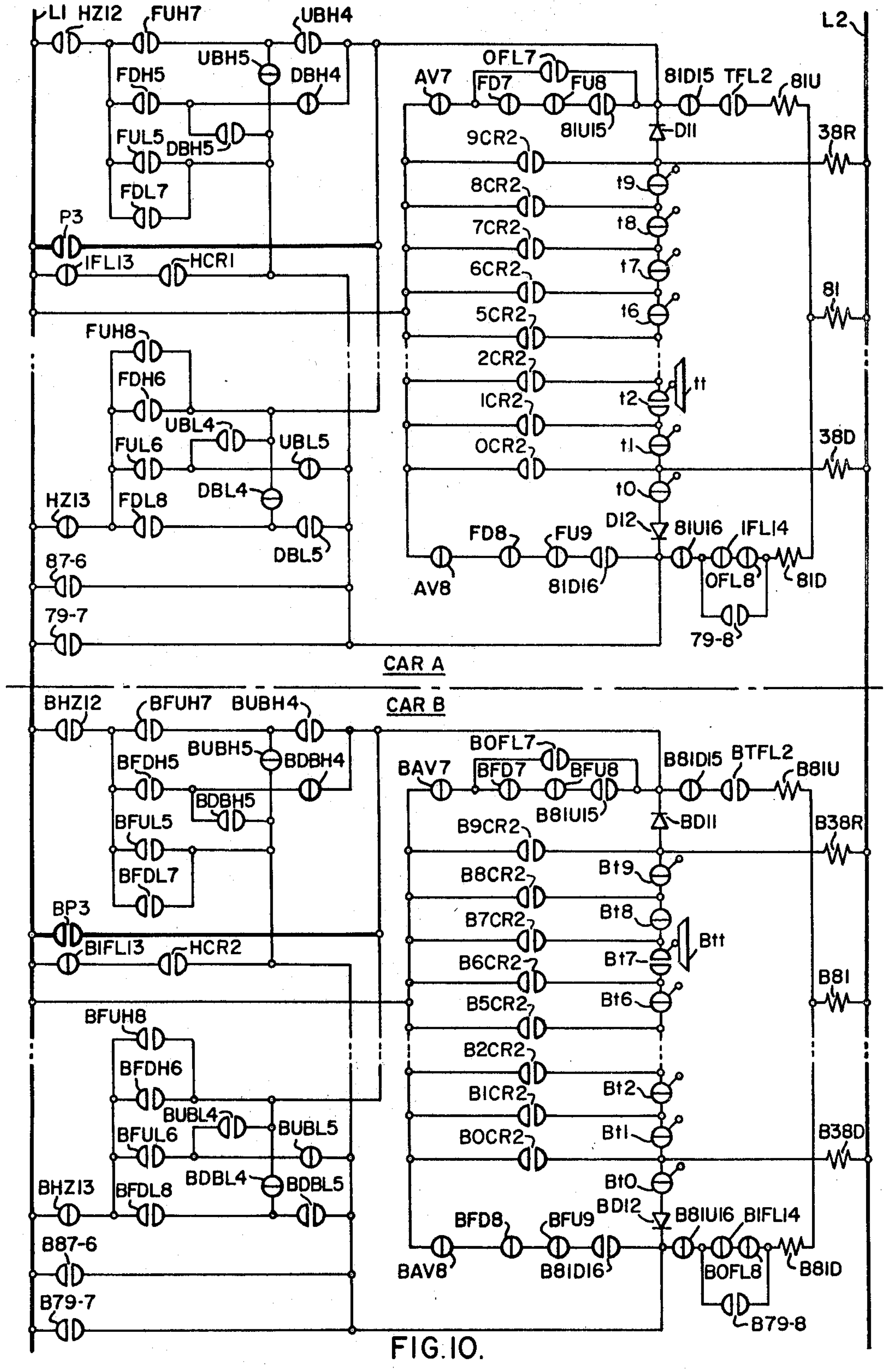

Referring to FIGURE 10 since the elevator car B is assigned to down demands in the high zone (make contacts BFDH6 closed) and since the car is not in the high zone (break contacts BHZ13 closed), a circuit is completed for energization of the up preference relay B81U. As can be seen from the circuits of FIGURE 1 and the explanation of those circuits in our copending application, the elevator car B will start running in the upward direction. When the elevator car B reaches the sixth floor and enters the high zone, the up preference relay B81U remains energized through the make contacts BHZ12 of the high zone relay, the make contacts BFDH5 of the down demand in the high zone assignment relay and in the break contacts BDBH4 of the down call demand in the high zone relay. The manner in which the relay BDBH (shown in FIGURE 4) is effective to initiate the stopping of an elevator car traveling in the up direction at the highest down call it is assigned to answer is fully explained in our copending application. However, it can be said that when the brush *ll* of the floor selector notches into the sixth floor position and comes into the contact with the segment B*l6*, the relay DBH remains deenergized since the break contacts 7DR5 of the seventh floor down call relay are open. When the floor selector of the elevator car B notches into the seventh floor position, however, the relay BDBH is energized through the contacts BATH2 in the following circuit:

L1, BATH2, B*l7*, B*ll*, BD7, BDBH, L2

Energization of the relay BDBH at this time indicates that the elevator car B has notched into the floor at which the highest down corridor call in the lower section of the low zone is registered. Opening of the contacts BDBH4 in FIGURE 10 deenergizes the relay B81U, and the closing of the break BDBH5 energizes the down preference relay B81D. Referring to FIGURE 2, dropout of the up preference relay closes the contacts B81U5. Since the contacts BU6 of the up switch are still closed, the circuit is completed for energization of the stopping relay B438. Reference to FIGURE 1 will reveal that this will initiate stopping of the elevator car B at the seventh floor. Notice that although there were down corridor calls in the high zone above the seventh floor, the B car only went to the highest down corridor call in the lower section of the high zone.

Next assume that a down corridor call is registered at the third floor. Remembering that the B car is at the seventh floor serving a down corridor call at that floor, no down demand will be created in the low zone. This is true because as it will be seen from reference to FIGURE 6 and specifically to the down demand in the low zone cutout relay DDLC, the B car which is set for down travel, and has no down corridor calls below it in the high zone, is in position to satisfy the down corridor call in the low zone. Hence there is no reason for dispatching another car to serve the call. Notice that even though the call at the third floor is registered in the lower section of the low zone no car will be dispatched to serve that lower section. This is true because a quota of calls in the low zone has not been exceeded. Referring to FIGURE 11, the down corridor call at the third floor opens the break contacts 3DR6 to insert the resistor R20 into the voltage divider circuit of the control grid of the tube TU3. However, this is insufficient to raise the grid voltage above the cathode voltage which is determined by the voltage divider comprising resistors R23, R27 and R28. Assume now that down corridor calls are also registered at the second floor and at the fifth floor. This will result in the introduction of the resistors R19 and R22 respectively into the grid voltage divider thereby raising the bias on the control grid of the tube TU3 sufficiently high to initiate conduction. When the tube TU3 conducts the relay QL will be energized in a manner similar to that in which the high zone lower section demand relay was energized, and the low zone lower section down demand relay LZD will be energized through the following circuit:

L1, DDLC3, QL3, 3DR8, MATL2, LZD, L2

Pickup of the relay QL closes the contacts QL1 in FIGURE 7, to complete a circuit for energization of the down demand in the low zone auxiliary relay DDLA. This results in closing of the make contacts DDLA4 and DDLA7 (not shown) in FIGURE 8. Since the C car is the only car that is available at this time, it will be assigned to down calls in the low zone by energization of the relay CFDL (not shown) through the contacts CAN3 (not shown) of the next available car relay.

Referring to FIGURE 12, the C car will be assigned to the lower section of the low zone through energization of the relay CATL (not shown) in a manner similar to the assignment of the B car to the lower section of the high zone. Closing of the contacts CATL4 in FIGURE 13 energizes the master lower section of the low zone assignment relay MATL which in turn deenergizes the lower section of the low zone demand relay LZD in FIGURE 11 through opening of the contacts MATL2. Assume therefore that the C car is dispatched to answer down corridor calls in the lower section of the low zone. This occurs even though a down corridor call exists in the upper section of the low zone to which a car has not been assigned because the B car is in position to answer the down call in the upper section of the low zone in short order.

Consider now that down corridor calls are registered at the eighth and seventh floors but that they have gone unanswered due to heavy traffic. Upon registration of the down corridor call at the seventh floor, the contacts 7DR7 in FIGURE 11 close to energize the down call in the high zone reference relay DHZ. Contacts DHZ1 of this relay are effective to initiate charging of the capacitor C2 which controls the grid voltage on tube TU4 also shown in FIGURE 11. The contacts DHZ2 open in order to permit the charge to build up on C2. If a down corridor call at the seventh floor remains unanswered for sixty seconds the voltage on the capacitor C2 becomes sufficient to fire the tube TU4. This results in energization of the high zone timing relay HZT. Energization of the relay HZT closes the make contacts HZT3 in FIGURE 7 to pick up the down peak relay ID. Referring to FIGURE 7, contacts ID4, ID7 and ID8 open, while contacts ID5, ID6, ID9 and ID14 close. Since the contacts HZT1 in FIGURE 7 are also closed, the relay DDHA is energized.

As previously described the relay DDHA closes the contacts DDHA2 and DDHA3 in FIGURE 8 thus preparing the circuits for the assignment of an elevator car to down corridor calls in the high zone when a car becomes available. Since no car is assigned or in position to answer the down corridor call at the eighth floor, the down demand in the high zone relay DDH will also be energized. This will open the contacts DDH6 in FIGURE 11 to prevent the assignment of a car to the lower section of the high zone until a car has been dispatched to take care of the highest down call in the high zone. However, with a timed out call at the seventh floor, the contacts HZT4 are closed to energize the relay HZD regardless of the normal down demand in the high zone.

Assume now that the A elevator car becomes available at the ninth floor. This will result in closing of the contacts AV9 in FIGURE 12. The A car will become the high zone available car, and through the contacts AHZ4 in FIGURE 8 it will be assigned to down calls in the high zone through energiaztion of the relay FDH. This causes the contacts FDH10 in FIGURE 12 to close and since, as just mentioned, the contacts HZD1 are closed, the A car will be assigned to the lower section of the high zone through the energization of the relay ATH. As stated above, the circuit just described only provides a pulse for the pickup of the relay ATH which is held in through its holding contacts ATH3 and the break contacts G2 of the holding relay.

To digress for a moment, it is necessary at this point to discuss the energization of the above lower section of high zone relay ALH shown in FIGURE 12. Whenever the elevator car A notches into the eighth floor position (brush *vv* in contact with segment *v*8) traveling in the up direction (make contacts 81U17 closed), the relay ALH is energized. The relay remains energized through the make contacts ALH3 and the switch 26, as long as the A car remains at or above the eighth floor. Therefore, as the elevator car A starts down from the ninth floor to serve a down corridor call in the low zone through the sequence including the energization of the down preference relay 8ID in FIGURE 10 as fully described in our copending application, the contacts ALH1 and ATH1 in the stopping circuits shown in FIGURE 2 are open. Consequently, the elevator car A will not stop for the down corridor call at the eighth floor even though the contacts FU2 (indicating that the elevator car A is not assigned to up demands) and FDL2 (indicating that the elevator car A is not assigned to down demands in the low zone) are closed, since the relay still cannot be energized. When the elevator car A floor selector notches into the seventh floor position, however, the cam *v′* opens the switch 26 to deenergize the relay ALH (see FIGURE 12). With the contacts ALH1 now closed, the following circuit is completed to energize the stopping relay 438 and initiate stopping at the seventh floor:

L1, 7DR1, *c*7, *cc*, ALH1, ATL1, 81D2, FU2, FDL2, M3, D1, LW2, 438, L2. (The contacts ALL1 remain open to indicate that the elevator car A is above the lower section of the low zone—see FIGURE 12.)

Energization of the relay 438 closes the contacts 438–1 in FIGURE 1. This in turn energizes the holding relay G. Opening of the break contacts G2 in FIGURE 12 deenergizes the lower section of the high zone assignment relay ATH. The elevator car A will then proceed downward stopping for down corridor calls that it comes to in a normal manner. The next car that becomes available will then be dispatched to serve the down corridor call at the eighth floor.

DEMAND PREFERENCES

As was described in great detail in our copending application, elevator cars are dispatched to serve particular demands for service. For this purpose the demands are recognized one at a time in a preferred order. The circuits which establish this preferred order are depicted in the upper part of the left-hand column of FIGURE 7. In our copending application up demands are given preference over down demands during off-peak operation. The down demands are followed in preference by demands for service at the main floor and the basement. During up peak operation, the up demands retain their preference over down demands, however, under down peak conditions, the down demands are given preference over the up demands.

The modifications of this basic scheme are shown in FIGURE 7 by the heavy lines. For purposes of illustration, assume for a moment that the system is operating under normal conditions (break contacts ID4, ID7 and ID8 closed, while make contacts ID5, ID6, ID9 and ID14 are open), that no cars are available, and that a down demand is registered in the high zone. The latter condition indicates that the contacts DDH4 are closed, thereby providing energization for the relay DDHA. Assume now that an up demand for service in the high zone is registered. This up demand will take preference over the down demand by energization of the relay UDHA through the following circuit:

L1, ID4, UDH4, UDHA, DPR1, L2

Energization of the relay UDHA results in opening of the contacts UDHA2 thereby canceling the preference given to the down demand in the high zone.

Assume now that the elevator car A becomes available at the main floor and is assigned to the up demand in the high zone. Consider that after the A car is above the low zone that an up demand is registered in the low zone. Under these circumstances, the down demand in the high zone is given preference over the up demand in the low zone. This occurs because the contacts DPR1 of the down demand preference relay are open thereby preventing up demands from receiving preference.

The circuits for energization of the relay DPR are shown in FIGURE 13. Since there is a down demand registered in the high zone, the contacts DDH7 are closed. In addition, since the elevator car A is traveling up, the contacts 81U19 are closed. Since it is not assigned to down demands the contacts FD10 are closed and since it is above the basement the contacts OFL11 are closed thereby completing a circuit for the energization of the relay DPR. The holding circuit for the relay DPR is established through the contacts DPR2 and UCT1 as long as a down demand exists in at least one of the zones (either DDH8 or DDL7 closed). The circuit which energizes the relay DPR also energizes the relay MCRU (master car running up relay). There is no holding circuit for this relay however, and it only remains energized as long as a car not assigned to down demands is traveling up above the basement floor while at least one down demand exists. With the up demands cut out, therefore, preference will be given to the down demand in the high zone by energization of the relay DDHA.

Assume that before a car can be dispatched to serve the down demand in the high zone, that a down demand is registered in the low zone (contacts DDL4 closed). With the contacts DDHA1 open the down demand in the low zone cannot be given preference. Assume now that the car B becomes available and is assigned to the down demands in the high zone. This will result in cancellation of the down demand in the high zone, however, the relay DPR will remain pick-up because as was just mentioned a down demand in the low zone is now registered. In other words, the holding circuit for the relay DPR in FIGURE 13 is maintained through the contacts DDL7.

With the cancellation of the down demand in the high zone, the down demand in the low zone is given preference by the energization of the relay DDLA. As long as down demands exist, the relay DPR remains energized and the up demand in the low zone cannot receive preference. However, when the A car completes its up trip (contacts 81U19 open) energization for the master car running up relay MCRU in FIGURE 13 is interrupted. This results in closing of the contacts MCRU1 and opening of the contacts MCRU2 in the up call timer circuit. Since there is an up call registered in the low zone, the contacts UCL3 are closed and therefore the capacitor C4 of the timer circuit begins to charge. When the voltage on the capacitor reaches the firing voltage of the tube TU6, the tube conducts energizing the relay UCT and thereby indicating that a predetermined time has elapsed since a car has been serving up corridor calls while down demands existed. Energization of the relay UCT opens the break contacts UCT1 in the holding circuit of the DPR relay, thereby deenergizing that relay. The closing of the contacts DPR1 in FIGURE 7 establishes a circuit for giving the up demand in the low zone preference over the down demand in the low zone for the assignment of the next available car.

It can be seen from FIGURE 7 that even though there is no down demand registered in a given zone, down corridor calls in the lower section of that zone may be given preference, and thereby have a car assigned to them, if the quota of calls for the cars serving down corridor calls in the zone is exceeded. For instance, even though the contacts DDH4 are open, the relay DDHA may be energized if a quota of calls is exceeded in the high zone (make contacts QH1 closed). Assignment of an extra car to a zone will not be made, however, if a down demand in the other zone remains unanswered. In the example just given, if a down demand exists in the low zone (break contacts DDL5 open), the relay DDHA may not be energized through the contacts QH1.

DOWN PEAK

According to the elevator system disclosed in our copending application, the system can be put into down peak operation when a car traveling in the down direction is detected to be filled to capacity. In addition, according to the present invention, the system may also be put on down peak operation if the quota of calls are exceeded in both zones, or a timed out down call exists in at least one zone.

Considering the worst case, assume that down calls are registered at all of the floors. This will result in energization of the high zone quota relay QH and the low zone quota relay QL shown in FIGURE 11 since the control grids of the tubes TU2 and TU3, respectively are biased positively by the introduction of the maximum resistance in the grid voltage dividers. Closing of the contacts QH2 and QL2 in FIGURE 7 provides a circuit for energization of the down peak relay ID. As previously mentioned, this results in the opening of the break contacts ID4, ID7 and ID8 and closing of the make ID5, ID6, ID9 and ID4 in the preference circuits of FIGURE 7. As was explained in our copending application, the first down demand to be registered will be given first preference, with preference then alternated between down demands in the high zone and the low zone.

Assume that down demands in the high zone are given first preference by energization of the relay DDHA. The first car to become available will then be assigned to down demands in the high zone and will be dispatched to the highest down call in the high zone. Even though a quota exists the car will not be dispatched to the lower section of the high zone because contacts DDH6 in FIGURE 11 prevent energization of the relay HZD JZD which is necessary to pickup the assigned low section of high zone relay ATH in FIGURE 12. If a car assigned to the down demand in the high zone, that demand will be canceled (see FIGURE 6). Although a quota of calls in the high zone is exceeded (four down calls are registered, and only one car is assigned) the next car to become available will not be assigned to the lower section of the high zone either. This is so because even with the contacts QH1 in FIGURE 7 closed, with the down demand in the high zone canceled (DDH4 open) and a down demand registered in the low zone (contacts DDL5 open) the preference relay DDHA cannot be energized. Therefore, preference will be alternated between down demands in the high zone and low zone. This is assuming that as soon as down calls are answered, new calls are registered at these floors.

If the car is assigned to answer down corridor calls in both the high zone and low zone become filled to capacity at the upper floors, they will bypass the floors in the lower sections of the zones thereby neglecting those floors. However, as was explained previously, if calls at selected floors in the lower section of the high zone and the low zone go unanswered for a predetermined time, the high zone and low zone timer relays will become energized. Assume that the low zone timer relay LZT in FIGURE 11, which is energized through the contacts DLZ1 which are closed anytime a down call is registered at the second floor (contacts 2DR7 closed), times out first. The contacts LZT1 in FIGURE 7 will close thereby completing the following circuit for energization of the relay DDLA:

L1, ID14, HZT2, LZT1, DDLA, L2

Assume however, that before a car becomes available to be assigned to the low zone timed out call, that the high zone timer times out thereby energizing the relay HZT in FIGURE 11. This will result in the closing of the contacts HZT1 in FIGURE 7 and opening of the contacts HZT2. Opening of the break contacts HZT2 deenergizes the relay DDLA while the closing of the contacts HZT1 energizes the relay DDHA. It is therefore seen that when timed out down calls exist in both zones that the timed out call in the high zone is given first preference. The next car that becomes available will therefore be assigned to down corridor calls in the lower section of the high zone. As was explained previously, this will be true even if down corridor calls in the upper section of the high zone create a normal down demand in the high zone. With the contacts DDHA1 open, the relay DDLA cannot be energized even if a down demand is registered in the low zone and contacts DDL4 close. From FIGURE 11 it is evident that even if a down demand exists in the high zone (break contacts DDH6 open) the high zone lower section demand relay HZD will be energized and thereby assign the car to the lower section of the high zone as long as the timed out call in the high zone remains unanswered (make contacts HZT4 closed. Once a car is assigned to the timed out call in the high zone, the contacts MATH1 of the master lower section of high zone assignment relay will open thereby deenergizing the relay HZT. This in turn will close the contacts HZT2 and permit the relay DDLA to be energized through the contacts LZT1.

It can be seen from the circuits of FIGURE 7 that a timed out down call will be given immediate preference and will even interrupt the alternating assignment of cars to the high zone and the low zone during peak down traffic conditions. However, once a car is assigned to the lower section of the zone in which the timed out call exists, the system will return to alternate assignment of available cars to down calls in the high zone and the low zone as long as the down peak traffic conditions exist.

It sometimes occurs that a car is assigned to a specific demand and then a passenger registers a car call. This most frequently occurs with the "next" car, which it will be recalled stands at the main floor with its doors open. It has been determined that car calls should be given priority over assignments. This is based on the consideration that persons already within the car become most frustrated if the car proceeds to a floor other than that for which they have registered a call. Since they are committed to that car and since any other car can serve the passenger who registers a call on a particular floor, the car call is given priority over the assignment.

Ordinarily cancellation of an assignment does not cause much difficulty. If no other demand is registered at the time, the demand will be reregistered and another available car or the next one to become available will be assigned to the demand. If another demand is registered at the time that the car was assigned to the first demand, the second demand will be given preference and will be assigned to the next available car. During normal operations this does not cause appreciable inconvenience. However, during down peak operation, when maximum effort is being directed toward giving equitable service to the many down corridor calls through alternation of the assignment of cars to the high zone and the low zone, cancellation of an assignment by a car call can create a significant imbalance in service to down calls in the high and low zone. Consequently, according to this invention, means are provided to reestablish the preference of a demand when a car call is registered in the car which had been assigned to satisfy the demand.

Suppose that the system is operating under down peak conditions, that down corridor calls are registered in both the high zone and the low zone and that a car has just been assigned to a down demand in the low zone. Assuming that a down demand also exists in the high zone, that demand will now be given preference by energization of the relay DDHA in FIGURE 1. Assume further that a down corridor call is registered in the low zone at a floor above the position of the car which is already serving down corridor calls in the low zone so that a down demand for the low zone is reestablished. Since the down demand in the high zone has preference, contacts DDHA1 are open so that preference cannot be given to the down demand in the low zone by energization of the relay DDLA.

Now suppose that the elevator car A becomes available and is assigned to the down demand in the high zone by energization of the relay FDH in FIGURE 8. Pickup of this relay cancels the down demand in the high zone by the opening of the contacts FDH2 in FIGURE 6. Contacts DDH4 in FIGURE 7 therefore open deenergizing the relay DDHA and closing the contacts DDHA1. This establishes a circuit for energization of the down demand preference relay DDLA through the down demand in the low zone contacts DDL4 so that the next car to become available will be assigned to the down demand in the low zone.

Consider that the A car had been the "next" available car at the main floor, so that it was standing at the main floor with its doors open when it was assigned to down demands in the high zone. Suppose further that as the doors begin to close a passenger enters the elevator car A at the main floor and presses the car call button for the fifth floor (a car call for any floor would do). Registration of the car call for the fifth floor results in energization of the relay 5CR in FIGURE 3. This causes the contacts 5CR2 in FIGURE 10 to close thereby completing a circuit for energization of the relay 38R indicating that a car call has been registered for a floor above the position of the car.

Energization of the relay 38R results in the opening of the break contacts 38R6 in FIGURE 8, thereby canceling assignment of the elevator car A to down demands in the high zone by deenergizing the relay FDH. Dropout of the relay FDH closes the make contacts FDH2 in FIGURE 6 and, if the same conditions with respect to down corridor calls in the high zone still exist, the down demand in the high zone will be reestablished by energization of the relay DDH. The relay DDH closes its make contacts DDH4 in FIGURE 7, but since the system is operating under down peak conditions the contacts ID8 are open, and since the down demand in the low zone has now been given preference, the contacts DDLA2 are open so that the down demand in the high zone has lost its preference.

In order to reestablish preference for the down demand in the high zone, contacts of the relay 38R and of the down demand in the high zone assignment relay FDH provide a circuit through the contacts ID14 of the down peak relay to reenergize the relay DDHA. As was just mentioned, the contacts of the relay 38R serve to deenergize the relay FDH. However, the contacts FDH7 are provided with means for delaying dropout for a time sufficient to permit reestablishment of the down demand in the high zone preference. A pulse of current is therefore supplied through the contacts ID14, 38R5 and FDH7 to energize the relay DDHA. Contacts DDHA1 then open to deenergize the relay DDLA. Dropout of relay DDLA permits the contacts DDLA2 to close, so that when the contacts DDH4 reclose after reestablishment of the down demand in the high zone, as described above, a circuit is reestablished for maintaining the energization of the relay DDHA until another car can be assigned to the demand.

If a car is assigned to a down demand in the low zone, and then a car call is registered to cancel the demand, preference can be reestablished through the FDL9 contacts of the associated car. Furthermore, if the call is registered for a floor below the position of the car, the contacts 38D3 of the associated car cooperate to reestablish the demand preference.

PARKING

Since cars can become available at and dispatched from any floor, the cars tend to become randomly distributed throughout the shaft. Under some circumstances however, for instance after periods of down traffic, the cars may all complete their trips at the main floor. If calls are registered so that demands will be created, the situation is only temporary and cars will soon be spread throughout the shaft again. However, if no demands exist, it has been found desirable to assign a car to proceed to an intermediate floor to park so that it will become available and be in position to reduce waiting time for subsequent calls at the upper floors. Since this is only an artificial demand, it is desirable that the car proceeding to the parking floor be capable of assignment to demands that should arise while the car is enroute. Since this car is already in motion, normal assignment procedures are suspended until it is determined whether the car proceeding to the parking floor is in position to satisfy the calls creating demands. If it is, then that car will be assigned to those calls. If not, then the normal assignment circuits are reactivated and another car will be dispatched to satisfy the demand.

By way of example, suppose that the B car is located at the main floor and is designated as the next available car (relay BAN in FIGURE 3 energized). Assume further that the C car is also located at the main floor and is designated as the "non-next" car (relay CANN—not shown but similar to relay BANN in FIGURE 3 energized). Suppose now that the elevator car A becomes available at the main floor, and that no demands for elevator service exist so that the master demand relay MD in FIGURE 13 is deenergized. Referring to FIGURE 12, the parking relay P for the elevator car A will then be energized since the elevator car A is not designated as the next car (break contacts N12 closed), is not designated as the non-next available car (break contacts ANN6 closed), no demands are registered (break contacts MD1 closed), the car is available (make contacts AV11 closed) and it is located at the main floor (make contacts 1FL17 closed). The relay P will remain energized through the holding contacts P4 as long as the car is not assigned to up or down demands (break contacts FU10 and FD9 respectively, closed) or until the elevator car A initiates a stopping sequence (when break contacts G4 open). With the relay P energized, the contacts P3 in FIGURE 10 close to energize the up preference relay 81U and initiate movement of the elevator car A to the parking floor.

Although any floor may be selected as the parking floor, it is more desirable to select a floor near the center of the building and for purposes of illustration the sixth floor, which is the lowest floor in the lower section of the high zone has been selected. Referring to FIGURE 1 it can be seen that when the floor selector of the elevator car A notches into the sixth floor position, the brush *xx* comes into contact with the segment *x6* hereby providing a circuit to energize the inductor slowdown and stopping relays E and F respectively and the holding relay G. As mentioned above, pickup of the relay G opens the contacts G4 in FIGURE 12 to deenergize the parking relay P (when the car moved away from the first floor make contacts 1FL17 and AV11 opened to interrupt the original energizing circuit). The elevator car A will therefore stop at the sixth floor and become available. In addition, it will become the high zone available car by energization of the relay AHZ in FIGURE 3 since, under the proposed conditions, no other car has yet been assigned as the high zone available car.

To back track for a moment, the normal assignment circuits are interrupted as the A car proceed sto the parking floor. This occurs because when the A car is initially assigned to park, make contacts P5 in FIGURE 13 close to energize the master parking relay MP. This causes the contacts MP1 and MP2 in FIGURE 8 to open. Although it also causes the contacts MP3 in the energizing circuit of the assignment delay relay DRL shown in FIGURE 13 to open, that relay remains energized through the contacts MD2 of the master demand relay. Therefore, the contacts DRL1 and DRL2 in FIGURE 8 are also open to prevent normal operation of the assignment circuits.

Now suppose that as the car is traveling up to the parking floor, a down demand in the high zone is registered. First of all the car will not immediately lose its parking designation because even though the contacts MD1 of the master demand relay in FIGURE 12 open, the relay P remains energized through the holding circuit. On the other hand, with a demand registered in the high zone, the contacts MD2 of the master demand relay open to interrupt the circuit through which DRL is normally energized. The relay DRL, however, does not dropout immediately since the capacitor C5 and resistor R17 shunting the relay provide a conventional time delay in dropout. Consequently, the normal assignment circuits remain deactivated for a sufficient length of time to premit the assignment of the car proceeding to the parking floor to the demand if the car is in position to serve the calls.

Since the parking relay P is only energized while the elevator car is proceeding from the main floor to the parking floor, which in this case is the lowest floor in the high zone, any car for which the parking relay is energized is in position to answer down demands in the high zone, since it is below all down corridor calls in the high zone and is not traveling in the up direction. This is reflected in FIGURE 8 by the fact that the elevator car A will be assigned to the down demands in the high zone through the following circuit:

L1, P2, DDHA3, FDH, L2

Energization of the relay FDH closes the contacts FDH4 to pickup the relay FD in FIGURE 8, which in turn opens its contacts FD9 in FIGURE 12 to deenergize the parking relay P. The elevator car proceeding to the parking floor is likewise always in position to answer up demands in the high zone since it is always below, or at least at, the floor at which the lowest up corridor call in the high zone is registered.

Assume now that the A car is assigned to park and that as it leaves the main floor, a down corridor call is registered at the fourth floor, thereby registering a down demand in a low zone. The contacts MP2 of the master parking relay and DRL2 of the assigment delay relay in FIGURE 8 will be open to suspend normal assignment of the cars to the down demand in the low zone as described above. Since the elevator car A is below the highest down corridor call, the relay DBL in FIGURE 4 will be deenergized (the break contacts 4DR2—not shown—of the fourth floor down corridor call relay are open). This means that the contacts DBL6 in FIGURE 8 will be closed so that the elevator car A will be assigned to the down demands in the low zone through the following circuit:

L1, P2, DBL6, DDLA5, FDL, L2

Assignment of the elevator car A to the down demand in the low zone will cancel the parking assignment by opening of the contacts FD9 in FIGURE 12.

Suppose however, that the elevator car A is at the fifth floor proceeding to the parking floor when the down corridor calls is registered at the fourth floor. Under these circumstances the elevator car A is above all of the down corridor calls in the low zone and therefore the relay DBL in FIGURE 4 is energized. In this case the contacts DBL6 in FIGURE 8 are open and the elevator car A cannot be assigned to the down demand in the low zone. Hence, the car will proceed to the parking floor in the manner described previously.

Where the elevator car proceeding to the parking floor is not in position to serve the demand, the normal assignment circuits are reestablished and normal assignment takes place. Circuit wise, if the car proceeding to the parking floor has not been assigned to serve the demand within a predetermined period of time, the relay DRL in FIGURE 13 will time out and be deenergized. This results in closing of the contacts DRL2 in FIGURE 8 so that the normal assignment circuits are reestablished. In the manner described in our copending application, the non-next available car, which in this case is the C car, will be assigned to satisfy the down demand in the low zone.

This leaves one situation to consider and that is what happens when up corridor calls are registered in the low zone as the car is proceeding to the parking floor. If the car is below, or at least at, the lowest up call in the low zone, the relay UBL will be energized (see FIGURE 4). Under these circumstances no up demand in the low zone will be created. For instance, if the elevator car A is proceeding to the parking floor, it will be traveling in the up direction so that the up preference relay contacts 81U9 in FIGURE 6 will be open, and since it is below all the up calls so that the contacts UBL3 are open, there is no path for energization of the up demand in low zone relay UDL. In other words, the car proceeding to the parking floor is in position to answer all the up calls above the car in the low zone, and therefore it is not necessary to create a demand and assign another car to serve those calls. The elevator car A will stop for each of the up calls in the low zone through the normal stopping circuit shown in FIGURE 2. When the car initiates a stopping sequence at the lowest floor at which an up call is registered, holding relay G in FIGURE 1 will be energized to dropout the parking relay P in FIGURE 12 by opening of the contacts G4.

If the elevator car A is above all of the up corridor calls in the low zone, it is not in position to answer any of them and it will proceed to the parking floor. Under these circumstances, the relay UBL in FIGURE 4 will be deenergized and therefore the circuit will be completed in FIGURE 6 for registration of an up demand in the low zone by energization of the relay UBL. In the intermediate case, where the elevator car proceeding to the parking floor is above some of the up corridor calls in the low zone, it will stop for those in front of it and lose its assigment to the parking floor as described above. On the other hand, an up demand in the low zone will be created so that another car can be assigned to answer the up calls in the low zone behind the car.

With the aid of the illustrative operations herein described, one skilled in the art will be able to trace the circuits disclosed to gain an appreciation of the improved elevator service provided for by this invention.

We claim as our invention:

1. A vehicular system comprising a structure having a plurality of spaced landings, said landings being divided into a plurality of zones with at least one zone comprising at least two landings, a plurality of cars, means mounting the cars for movement relative to the structure to serve the landings, first-direction landing call registering means operable for registering a call for service in a first direction from each of a plurality of said landings, availability means conditioning each of the cars in response to predetermined conditions to be an available car for answering calls registered by either of the call registering means, demand registering means effective to register a demand for service to each of a plurality of zones in response to predetermined conditions including registration of a call by the first-direction landing call registering means for a landing within the associated zone and the absence of a car-conditioned to serve the registered call, assigning means for assigning an available car to demands registered by the demand registering means and including means conditioning an assigned car to serve the first direction landing calls in the assigned zone, control means for initiating movement of an assigned car to satisfy the demand to which it is assigned, and the improvement which comprises quota means associated with at least a one zone and responsive to the number of calls registered in the associated zone for service in a first direction and the number of cars serving the first direction calls in that zone, said quota means having a first condition when the number of calls in the first direction in that zone is equal to or less than a predetermined number per car conditioned to serve first direction calls in the zone, said quota means having a second condition when the number of calls in the first direction in that zone per car conditioned to serve first direction calls exceeds the predetermined number, said assigning means including means effective to assign another available car to a zone when said associated quota means is in said second condition, said control means being responsive to the assignment means to initiate movement of the additional car to the assigned zone.

2. The vehicular system of claim 1 including means operative to render said assignment means unresponsive to the opeartion of a quota means to said second condition while a demand is registered by the demand registering means, whereby an additional car will not be assigned to a zone until all of the demands have been provided for.

3. The vehicular system of claim 1 wherein a predetermined number of landings within a plurality of the zones are designated as a section of the associated zone, said section comprising a predetermined number of landings which are the farthest within the zone in said first direction, and wherein the assignment means is operative to assign available cars independently to a first assignment to serve landing calls for service in the first direction within a first zone by proceeding first to the landing call for service in the first direction which is the farthest in the second direction within the first zone, and to a second assignment to serve landing calls for service in the first direction within the first zone by proceeding to the landing call for service in the first direction which is the farthest in the second direction within the designated section of the first zone.

4. The vehicular system of claim 3 wherein the assignment means is operative in response to the registration by the demand registering means of a demand for service in said first direction within the first zone when said quota means for the first zone is in said second condition to assign a first available car to said first assignment within the first zone and to assign a second available car to said second assignment within the first zone.

5. The vehicular system of claim 3 wherein the assignment means is operative in response to the absence of the registration by the demand registering means of a demand for service in the first direction within the first zone when the associated quota means is in the second condition to assign an available car to said second assignment within the first zone.

6. The vehicular system of claim 3 wherein the assignment means is operative in response to the absence of the registration by the demand registering means of a demand for service in the first direction within the first zone when no landing calls for service in the first direction are registered in the designated section of the first zone but when the associated quota means is in said second condition to assign an available car to said first assignment within the first zone.

7. The vehicular system of claim 3 wherein said cars are elevator cars wherein said landings are vertically spaced floors, wherein a plurality of said floors are divided into a high zone and a low zone, wherein the predetermined number of floors comprising the designated section of the high zone includes the lowest floors in the high zone which are designated as the lower section of the high zone while the predetermined number of floors comprising the designated section of the lower zone includes floors in the low zone which are designated as the lower section of the low zone, and wherein said first assignment by the assignment means comprises the assignment of an available car to the highest down floor call in the given zone while said second assignment comprises the assignment of an available car to the highest down floor call in the lower section of the given zone.

8. The elevator system of claim 7 wherein the assignment means is responsive to the registration by the demand registering means of a down demand in a first zone when said quota means associated with said first zone is in said second condition, to assign a first available car to said first assignment within said first zone and to assign a second available car to said second assignment within said first zone.

9. The elevator system of claim 7 wherein the assignment means is operative in the absence of the registration by the demand registering means of a down demand in a first zone when the quota means for said first zone is in said second condition, to assign available cars to the second assignment within the first zone.

10. The elevator system of claim 7 wherein the assignment means is operative in the absence of the registration by the demand registering means of a down demand in a first zone when no down floor calls are registered in the lower section of the first zone but when the quota means for the first zone is in said second condition to assign an available car to said first assignment within the first zone.

11. The elevator system of claim 7 wherein the assignment means is operative in response to the absence of the registration by the demand registering means of a down demand in a first zone when the quota means for said first zone is in said second condition but when a down demand in the second zone is registered by the demand registering means, to assign a first available car to the first assignment in said second zone and a second available car to the second assignment in the first zone.

12. The vehicular system of claim 3 including timing means for measuring the elapsed time that a landing call is registered for service in the first direction by the call registering means for a selected landing in the designated section of a first zone, said timing means having a first condition when the registered call has remained uncanceled at the selected landing for longer than a predetermined time and having a second condition otherwise, wherein the assigning means is operative to assign an available car to said second assignment in the first zone whenever said timing means is in said first condition.

13. A vehicular system comprising a structure having a plurality of spaced landings, a plurality of cars, means mounting the cars for movement relative to the structure for serving the landing, first-direction landing call registering means for registering a call for service in a first direction from each of a plurality of said landings, second-direction landing call registering means operable for registering a call for service in a second direction from each of a plurality of said landings, availability means conditioning each of the cars in response to predetermined conditions to be an available car for answering calls registered by either of the call registering means, demand registering means effective to register a plurality of demands for service in response to predetermined conditions including the registration of a call by the call registering means, assigning means for assigning an available car to the demands registered by the demand registering means, demand preference means for selecting one of said demands at a time in a predetermined order to be satisified by the assignment of an available car by said assigning means, said preference means being normally operable to a first condition to give demands in a first direction preference over demands in a second direction and operable to a second condition to give demands in the second direction preference over demands in the first direction and the improvement which comprises means for operating the preference means from said first condition to said second condition as long as at least one car is serving landing calls in the first direction and demands are registered for service in the second direction.

14. The vehicular system of claim 13 including means to maintain said preference means in said second condition for a predetermined time after a car serving landing calls in the first direction completes its trip in said first direction.

15. The vehicular system of claim 13 wherein the cars are elevator cars, wherein the landings are vertically-spaced floors, said floors being divided into a plurality of zones, each zone comprising at least one floor, and including quota means associated with a plurality of the zones which are responsive to the number of calls registered in the associated zone for service in the second direction and the number of cars serving calls in the second direction in the associated zone, said quota means having a first condition when the number of calls in the associated zone for service in the second direction per car serving calls in the second direction exceeds a predetermined number and having a second condition otherwise, and including means for operating said preference means to its second condition when a plurality of said quota means are in said second condition.

16. The elevator system of claim 15 wherein said zones comprise a high zone and a low zone, wherein said first direction is the up direction and the second direction is the down direction, wherein a car is serving up floor calls when it is assigned by the assigning means to serve up demands and when it is traveling up but not assigned to down demands, and wherein the preference means is operated to the second condition when the quota means associated with the high and low zones are both in the second condition.

17. The vehicular system of claim 13 wherein said landings include a parking landing and wherein the system includes parking means responsive to the absence of the registration of a demand by the demand registering means for dispatching a car to proceed to the parking landing, said parking means including means for conditioning the car proceeding to the parking landing to be available for assignment by said assignment means to a demand which is given preference by the demand preference means while said car is en route to the parking landing.

18. The vehicular system of claim 17 including means responsive to the operation of said parking means to render said assigning means temporarily ineffective to assign a car, other than the car dispatched to the parking landing, to a demand which has been given preference by the demand preference means.

19. The vehicular system of claim 18 including means responsive to the approach of a car proceeding to the parking landing to a landing at which a call is registered for service in the direction of travel of such car, for stopping the car at said last mentioned landing.

20. A vehicular system comprising a structure having a plurality of spaced landings, a plurality of cars, means mounting the cars for movement relative to the structure to serve the landings, first-direction landing call registering means operable for registering a call for service in a first direction from each of a plurality of said landings, second-direction landing call registering means operable for registering a call for service in a second direction from each of a plurality of said landings, availability means conditioning each of the cars in response to predetermined conditions to be an available car for answering calls registered by either of the call registering means, demand registering means effective to register a plurality of demands for service in response to predetermined conditions including registration of a call by the call registering means, assigning means for assigning an available car to the demands registered by the demand registering means, control means for regulating the movement of the cars including movement to answer calls to which assigned, indicating means for indicating the position of each car including the position of each car with respect to registered floor calls, parking means for assigning an idle car under predetermined conditions to proceed to a preselected landing to await assignment by said assignment means and the improvement which comprises parking car assignment means for assigning the car proceeding to the parking landing to serve landing calls when said indicating means indicates that said car is in position to serve the registered landing calls.

21. The vehicular system of claim 18 including means for suspending normal assignment of cars by the assigning means for a period of time of sufficient duration to permit said parking car assignment means to assign a car proceeding to the parking floor to serve floor calls which said indicating means indicates that said car is in position to serve.

22. The vehicular system of claim 21 wherein the cars are elevator cars, the landings are vertically-spaced floors, wherein said floors are divided into at least two zones, a high zone and a low zone, comprising at least one floor each, wherein demands registered by the demand registering means include demands for up and down elevator service in each zone, wherein a floor below the lower zone is the main floor, wherein the parking floor is the lowest floor in the high zone, wherein the predetermined conditions under which an idle car is assigned by the parking means to proceed to the parking floor include the conditions that the car is available at the main floor and that no demands for service are registered by the demand registering means.

23. The elevator system of claim 22 wherein said indicating means will indicate that a car proceeding to the parking floor is in position to serve a floor call when the call is effective to register a down demand for the high zone, an up demand for the high zone, a down demand for the low zone providing that the car is below the highest down call in the low zone, and when the call is an up call in the low zone which is above the position of the car.

References Cited

UNITED STATES PATENTS

| | | | |
|---|---|---|---|
| 3,378,107 | 4/1968 | Madison | 187—29 |
| 3,443,668 | 5/1969 | Hall et al. | 187—29 |

ORIS L. RADER, Primary Examiner

W. E. DUNCANSON, Jr., Assistant Examiner